(12) United States Patent
Mountain

(10) Patent No.: US 9,681,196 B2
(45) Date of Patent: Jun. 13, 2017

(54) TELEVISION RECEIVER-BASED NETWORK TRAFFIC CONTROL

(71) Applicant: ECHOSTAR UK HOLDINGS LIMITED, Keighley, West Yorkshire (GB)

(72) Inventor: Dale Llewelyn Mountain, Keighley (GB)

(73) Assignee: ECHOSTAR TECHNOLOGIES L.L.C., Englewood, CO (US)

( * ) Notice: Subject to any disclaimer, the term of this patent is extended or adjusted under 35 U.S.C. 154(b) by 0 days.

(21) Appl. No.: 14/470,392

(22) Filed: Aug. 27, 2014

(65) Prior Publication Data

US 2016/0066056 A1    Mar. 3, 2016

(51) Int. Cl.
| | |
|---|---|
| H04N 7/16 | (2011.01) |
| H04N 21/61 | (2011.01) |
| H04N 21/436 | (2011.01) |
| H04N 21/4385 | (2011.01) |
| H04N 21/442 | (2011.01) |
| H04N 21/454 | (2011.01) |
| H04N 21/4623 | (2011.01) |
| H04N 21/485 | (2011.01) |
| H04N 21/488 | (2011.01) |

(52) U.S. Cl.
CPC ..... *H04N 21/6143* (2013.01); *H04N 21/4385* (2013.01); *H04N 21/43615* (2013.01); *H04N 21/44245* (2013.01); *H04N 21/4542* (2013.01); *H04N 21/4623* (2013.01); *H04N 21/485* (2013.01); *H04N 21/4882* (2013.01)

(58) Field of Classification Search
CPC combination set(s) only.
See application file for complete search history.

(56) References Cited

U.S. PATENT DOCUMENTS 6,005,562 A    12/1999    Shiga et al.
6,177,931 B1    1/2001    Alexander et al.
(Continued)

FOREIGN PATENT DOCUMENTS

EP    1 865 716 A2    12/2007
EP    2 309 733 B1    4/2011
(Continued)

OTHER PUBLICATIONS

Extended European Search Report for EP 14160140.1 received Jul. 7, 2014, 7 pages.
(Continued)

*Primary Examiner* — Brian T Pendleton
*Assistant Examiner* — Alexander Gee
(74) *Attorney, Agent, or Firm* — Kilpatrick Townsend & Stockton LLP

(57) ABSTRACT

Monitoring data routed by a satellite television receiver that serves as a gateway in a home network. In the context of privacy control, the television receiver may be configured to detect certain types of data, such as social security or bank numbers, username/password information, device usage information, etc., routed by the same over a broadband connection to one or more resources located outside of the home network, and then implement one or more steps so that a user may be notified and the traffic possibly blocked to prevent or mitigate the unauthorized transfer or reporting of data.

20 Claims, 8 Drawing Sheets

(56) References Cited

U.S. PATENT DOCUMENTS

| | | |
|---|---|---|
| 6,681,396 B1 | 1/2004 | Bates et al. |
| 7,174,512 B2 | 2/2007 | Martin et al. |
| 7,197,715 B1 | 3/2007 | Valeria |
| 7,633,887 B2 | 12/2009 | Panwar et al. |
| 7,680,894 B2 | 3/2010 | Diot et al. |
| 7,774,811 B2 | 8/2010 | Poslinski et al. |
| 7,818,368 B2 | 10/2010 | Yang et al. |
| 7,825,989 B1 | 11/2010 | Greenberg |
| 7,849,487 B1 | 12/2010 | Vosseller |
| 8,046,798 B1 | 10/2011 | Schlack et al. |
| 8,079,052 B2 | 12/2011 | Chen et al. |
| 8,104,065 B2 | 1/2012 | Aaby et al. |
| 8,209,713 B1 | 6/2012 | Lai et al. |
| 8,296,797 B2 | 10/2012 | Olstad et al. |
| 8,312,486 B1 | 11/2012 | Briggs et al. |
| 8,424,041 B2 | 4/2013 | Candelore et al. |
| 8,627,349 B2 | 1/2014 | Kirby et al. |
| 8,689,258 B2 | 4/2014 | Kemp |
| 8,752,084 B1 | 6/2014 | Lai et al. |
| 8,973,038 B2 | 3/2015 | Gratton |
| 8,973,068 B2 | 3/2015 | Kotecha et al. |
| 8,990,418 B1 | 3/2015 | Bragg et al. |
| 9,038,127 B2 | 5/2015 | Hastings et al. |
| 9,066,156 B2 | 6/2015 | Kapa |
| 9,213,986 B1 | 12/2015 | Buchheit et al. |
| 9,253,533 B1 | 2/2016 | Morgan et al. |
| 9,264,779 B2 | 2/2016 | Kirby et al. |
| 9,420,333 B2 | 8/2016 | Martch et al. |
| 2001/0013123 A1 | 8/2001 | Freeman et al. |
| 2001/0026609 A1 | 10/2001 | Weinstein et al. |
| 2002/0059610 A1 | 5/2002 | Ellis |
| 2002/0067376 A1 | 6/2002 | Martin et al. |
| 2002/0075402 A1 | 6/2002 | Robson et al. |
| 2002/0174430 A1 | 11/2002 | Ellis et al. |
| 2002/0178444 A1 | 11/2002 | Trajkovic et al. |
| 2003/0023742 A1 | 1/2003 | Allen et al. |
| 2003/0056220 A1 | 3/2003 | Thornton et al. |
| 2003/0066077 A1 | 4/2003 | Gutta et al. |
| 2003/0118014 A1 | 6/2003 | Iyer et al. |
| 2003/0126605 A1 | 7/2003 | Betz et al. |
| 2003/0126606 A1 | 7/2003 | Buczak et al. |
| 2003/0188317 A1 | 10/2003 | Liew et al. |
| 2003/0189674 A1 | 10/2003 | Inoue et al. |
| 2003/0208763 A1 | 11/2003 | McElhatten et al. |
| 2003/0229899 A1 | 12/2003 | Thompson et al. |
| 2004/0181807 A1 | 9/2004 | Theiste et al. |
| 2005/0030977 A1 | 2/2005 | Casey et al. |
| 2005/0044570 A1 | 2/2005 | Poslinski |
| 2005/0071865 A1 | 3/2005 | Martins |
| 2005/0125302 A1 | 6/2005 | Brown et al. |
| 2005/0152565 A1 | 7/2005 | Jouppi et al. |
| 2005/0166230 A1 | 7/2005 | Gaydou et al. |
| 2005/0180568 A1 | 8/2005 | Krause |
| 2005/0191041 A1 | 9/2005 | Braun et al. |
| 2005/0240961 A1 | 10/2005 | Jerding et al. |
| 2005/0264705 A1 | 12/2005 | Kitamura |
| 2006/0020962 A1 | 1/2006 | Stark et al. |
| 2006/0085828 A1 | 4/2006 | Dureau et al. |
| 2006/0174277 A1 | 8/2006 | Sezan et al. |
| 2006/0190615 A1 | 8/2006 | Panwar et al. |
| 2006/0238656 A1 | 10/2006 | Chen et al. |
| 2006/0253581 A1* | 11/2006 | Dixon ............... G06F 17/30861 709/225 |
| 2006/0282852 A1 | 12/2006 | Purpura et al. |
| 2006/0282869 A1 | 12/2006 | Plourde, Jr. |
| 2007/0033616 A1 | 2/2007 | Gutta |
| 2007/0058930 A1 | 3/2007 | Iwamoto |
| 2007/0083901 A1 | 4/2007 | Bond |
| 2007/0127894 A1 | 6/2007 | Ando et al. |
| 2007/0146554 A1 | 6/2007 | Strickland et al. |
| 2007/0154163 A1* | 7/2007 | Cordray ............. H04N 21/6187 386/278 |
| 2007/0154169 A1 | 7/2007 | Cordray et al. |
| 2007/0157235 A1 | 7/2007 | Teunissen |
| 2007/0157249 A1 | 7/2007 | Cordray et al. |
| 2007/0157253 A1 | 7/2007 | Ellis et al. |
| 2007/0188655 A1 | 8/2007 | Ohta |
| 2007/0199040 A1 | 8/2007 | Kates |
| 2007/0204302 A1 | 8/2007 | Calzone |
| 2007/0226766 A1 | 9/2007 | Poslinski et al. |
| 2007/0245379 A1 | 10/2007 | Agnihortri |
| 2008/0022012 A1 | 1/2008 | Wang |
| 2008/0060006 A1 | 3/2008 | Shanks et al. |
| 2008/0086743 A1 | 4/2008 | Cheng et al. |
| 2008/0097949 A1 | 4/2008 | Kelly et al. |
| 2008/0109307 A1 | 5/2008 | Ullah |
| 2008/0134043 A1 | 6/2008 | Georgis et al. |
| 2008/0163305 A1 | 7/2008 | Johnson et al. |
| 2008/0195457 A1 | 8/2008 | Sherman et al. |
| 2008/0235348 A1 | 9/2008 | Dasgupta |
| 2008/0239169 A1 | 10/2008 | Moon et al. |
| 2008/0300982 A1 | 12/2008 | Larson et al. |
| 2008/0320523 A1 | 12/2008 | Morris et al. |
| 2009/0044217 A1 | 2/2009 | Lutterbach et al. |
| 2009/0055385 A1 | 2/2009 | Jeon et al. |
| 2009/0102984 A1 | 4/2009 | Arling et al. |
| 2009/0138902 A1 | 5/2009 | Kamen |
| 2009/0178071 A1 | 7/2009 | Whitehead |
| 2009/0234828 A1 | 9/2009 | Tu |
| 2009/0249412 A1 | 10/2009 | Bhogal et al. |
| 2009/0293093 A1 | 11/2009 | Igarashi |
| 2009/0299824 A1 | 12/2009 | Barnes, Jr. |
| 2009/0325523 A1* | 12/2009 | Choi ..................... H04H 20/38 455/185.1 |
| 2010/0040151 A1 | 2/2010 | Garrett |
| 2010/0071007 A1 | 3/2010 | Meijer |
| 2010/0071062 A1 | 3/2010 | Choyi et al. |
| 2010/0089996 A1 | 4/2010 | Koplar |
| 2010/0115554 A1 | 5/2010 | Drouet et al. |
| 2010/0122294 A1 | 5/2010 | Craner |
| 2010/0146560 A1 | 6/2010 | Bonfrer |
| 2010/0153983 A1 | 6/2010 | Phillmon et al. |
| 2010/0153999 A1 | 6/2010 | Yates |
| 2010/0158479 A1 | 6/2010 | Craner |
| 2010/0166389 A1 | 7/2010 | Knee et al. |
| 2010/0169925 A1 | 7/2010 | Takegoshi |
| 2010/0218214 A1 | 8/2010 | Fan et al. |
| 2010/0251295 A1 | 9/2010 | Amento et al. |
| 2010/0262986 A1 | 10/2010 | Adimatyam et al. |
| 2010/0269144 A1 | 10/2010 | Forsman et al. |
| 2010/0319019 A1 | 12/2010 | Zazza |
| 2010/0322592 A1 | 12/2010 | Casagrande |
| 2010/0333131 A1 | 12/2010 | Parker et al. |
| 2011/0016492 A1 | 1/2011 | Morita |
| 2011/0019839 A1 | 1/2011 | Nandury |
| 2011/0052156 A1 | 3/2011 | Kuhn |
| 2011/0072448 A1 | 3/2011 | Stiers et al. |
| 2011/0109801 A1 | 5/2011 | Thomas et al. |
| 2011/0202956 A1 | 8/2011 | Connelly et al. |
| 2011/0206342 A1 | 8/2011 | Thompson et al. |
| 2011/0239249 A1 | 9/2011 | Murison et al. |
| 2011/0243533 A1 | 10/2011 | Stern et al. |
| 2011/0252451 A1 | 10/2011 | Turgeman et al. |
| 2011/0286721 A1 | 11/2011 | Craner |
| 2011/0289410 A1 | 11/2011 | Paczkowski et al. |
| 2011/0293113 A1 | 12/2011 | McCarthy |
| 2012/0020641 A1 | 1/2012 | Sakaniwa et al. |
| 2012/0052941 A1 | 3/2012 | Mo |
| 2012/0060178 A1 | 3/2012 | Minakuchi et al. |
| 2012/0106932 A1 | 5/2012 | Grevers, Jr. |
| 2012/0131613 A1 | 5/2012 | Ellis et al. |
| 2012/0185895 A1 | 7/2012 | Wong et al. |
| 2012/0204209 A1 | 8/2012 | Kubo |
| 2012/0230651 A1 | 9/2012 | Chen |
| 2012/0246672 A1 | 9/2012 | Sridhar et al. |
| 2012/0278837 A1 | 11/2012 | Curtis et al. |
| 2012/0311633 A1 | 12/2012 | Mandrekar et al. |
| 2013/0014159 A1 | 1/2013 | Wiser et al. |
| 2013/0055304 A1 | 2/2013 | Kirby et al. |
| 2013/0061313 A1* | 3/2013 | Cullimore ........... H04L 63/0227 726/13 |
| 2013/0074109 A1 | 3/2013 | Skelton et al. |
| 2013/0114940 A1 | 5/2013 | Merzon et al. |
| 2013/0128119 A1 | 5/2013 | Madathodiyil et al. |

(56) References Cited

U.S. PATENT DOCUMENTS

| | | | |
|---|---|---|---|
| 2013/0145023 A1* | 6/2013 | Li | H04N 21/44222 709/224 |
| 2013/0174196 A1 | 7/2013 | Herlein | |
| 2013/0194503 A1 | 8/2013 | Yamashita | |
| 2013/0263189 A1 | 10/2013 | Garner | |
| 2013/0283162 A1 | 10/2013 | Aronsson et al. | |
| 2013/0298151 A1 | 11/2013 | Leske et al. | |
| 2013/0332962 A1 | 12/2013 | Moritz et al. | |
| 2013/0346302 A1* | 12/2013 | Purves | G06Q 20/102 705/40 |
| 2014/0032709 A1 | 1/2014 | Saussy et al. | |
| 2014/0068675 A1 | 3/2014 | Mountain | |
| 2014/0123160 A1 | 5/2014 | van Coppenolle et al. | |
| 2014/0139555 A1 | 5/2014 | Levy | |
| 2014/0140680 A1 | 5/2014 | Jo | |
| 2014/0153904 A1 | 6/2014 | Adimatyam et al. | |
| 2014/0157327 A1 | 6/2014 | Roberts et al. | |
| 2014/0215539 A1 | 7/2014 | Chen et al. | |
| 2014/0282714 A1 | 9/2014 | Hussain | |
| 2014/0282741 A1 | 9/2014 | Shoykhet | |
| 2014/0282745 A1 | 9/2014 | Chipman et al. | |
| 2014/0282759 A1 | 9/2014 | Harvey et al. | |
| 2014/0294201 A1 | 10/2014 | Johnson et al. | |
| 2014/0310819 A1 | 10/2014 | Cakarel et al. | |
| 2014/0313341 A1 | 10/2014 | Stribling | |
| 2014/0325556 A1 | 10/2014 | Hoang et al. | |
| 2014/0331260 A1 | 11/2014 | Gratton | |
| 2014/0333841 A1 | 11/2014 | Steck | |
| 2014/0351045 A1 | 11/2014 | Abihssira et al. | |
| 2014/0373079 A1 | 12/2014 | Friedrich et al. | |
| 2015/0003814 A1 | 1/2015 | Miller | |
| 2015/0020097 A1 | 1/2015 | Freed et al. | |
| 2015/0040176 A1 | 2/2015 | Hybertson et al. | |
| 2015/0058890 A1 | 2/2015 | Kapa | |
| 2015/0095932 A1 | 4/2015 | Ren | |
| 2015/0118992 A1* | 4/2015 | Wyatt | H04W 12/08 455/410 |
| 2015/0181132 A1 | 6/2015 | Kummer et al. | |
| 2015/0181279 A1 | 6/2015 | Martch et al. | |
| 2015/0249803 A1 | 9/2015 | Tozer et al. | |
| 2015/0249864 A1 | 9/2015 | Tang et al. | |
| 2015/0310725 A1 | 10/2015 | Koskan et al. | |
| 2016/0066020 A1 | 3/2016 | Mountain | |
| 2016/0066026 A1 | 3/2016 | Mountain | |
| 2016/0066049 A1 | 3/2016 | Mountain | |
| 2016/0073172 A1 | 3/2016 | Sharples | |
| 2016/0088351 A1 | 3/2016 | Petruzzelli et al. | |
| 2016/0191147 A1 | 6/2016 | Martch | |
| 2016/0198229 A1 | 7/2016 | Keipert | |
| 2016/0309212 A1 | 10/2016 | Martch et al. | |

FOREIGN PATENT DOCUMENTS

| | | |
|---|---|---|
| EP | 2 403 239 A1 | 1/2012 |
| FR | 2 902 568 A1 | 12/2007 |
| JP | H10 322622 A | 12/1998 |
| JP | 2006-245745 A | 9/2006 |
| KR | 2004 0025073 A | 3/2004 |
| KR | 2006 0128295 A | 12/2006 |
| WO | 98/37694 A1 | 8/1998 |
| WO | 2005/059807 A2 | 6/2005 |
| WO | 2007/064987 A2 | 6/2007 |
| WO | 2007/098067 A1 | 8/2007 |
| WO | 2009/073925 A1 | 6/2009 |
| WO | 2013/016626 A1 | 1/2013 |
| WO | 2014/072742 A1 | 5/2014 |
| WO | 2014/179017 A1 | 11/2014 |
| WO | 2016/030384 | 3/2016 |
| WO | 2016/030477 A1 | 3/2016 |
| WO | 2016/034899 A1 | 3/2016 |
| WO | 2016/055761 A1 | 4/2016 |

OTHER PUBLICATIONS

Extended European Search Report for EP 11166892.7 dated Oct. 6, 2011, 7 pages.
International Search Report and Written Opinion of PCT/US2014/033796 mailed Sep. 5, 2014, 12 pages.
U.S. Appl. No. 13/919,702, filed Jun. 17, 2013 Non Final Office Action mailed Jun. 11, 2014, 25 pages.
U.S. Appl. No. 13/942,451, filed Jul. 15, 2013 Non Final Office Action mailed Jul. 28, 2014, 27 pages.
U.S. Appl. No. 13/971,579, filed Aug. 20, 2013 Non Final Office Action mailed Oct. 28, 2014, 35 pages.
U.S. Appl. No. 14/200,864, filed Mar. 7, 2014, Non-Final Office Action mailed Dec. 5, 2014, 35 pages.
U.S. Appl. No. 14/095,860, filed Dec. 3, 2013 Non-Final Office Action mailed Dec. 26, 2014, 45 pages.
U.S. Appl. No. 13/886,873, filed May 3, 2013, Notice of Allowance mailed Oct. 24, 2014, 40 pages.
U.S. Appl. No. 13/919,702, filed Jun. 17, 2013 Final Office Action mailed Nov. 18, 2014, 24 pages.
Jin S H et al., "Intelligent broadcasting system and services for personalized semantic contents consumption", Expert Systems With Applications, Oxford, GB, vol. 31, No. 1, Jul. 1, 2006, pp. 164-173, XP024962718, ISSN: 0957-4174, DOI: 10.1016/J.ESWA.2005.09.021.
Sung Ho Jin et al., "Real-time content filtering for live broadcasts in TV terminals", Multimedia Tools and Applications, Kluwer Academic Publishers, BO, vol. 36, No. 3, Jun. 29, 2007 pp. 285-301, XP019578768, ISSN: 1573-7721.
European Search Report for EP 14197940.1 mailed Apr. 28, 2015, 13 pages.
U.S. Appl. No. 14/139,420, filed Dec. 23, 2013 Non-Final Office Action mailed Apr. 30, 2015, 27 pages.
U.S. Appl. No. 14/095,860, filed Dec. 3, 2013 Final Office Action mailed May 1, 2015, 18 pages.
U.S. Appl. No. 14/071,613, filed Nov. 4, 2013 Non-Final Office Action mailed May 18, 2015, 20 pages.
U.S. Appl. No. 13/942,451, filed Jul. 15, 2013 Final Office Action mailed Apr. 30, 2015, 33 pages.
U.S. Appl. No. 13/971,579, filed Aug. 20, 2013 Notice of Allowance mailed Feb. 27, 2015, 28 pages.
U.S. Appl. No. 13/919,702, filed Jun. 17, 2013 Non-Final Office Action mailed Apr. 30, 2015, 26 pages.
U.S. Appl. No. 14/200,864, filed Mar. 7, 2014 Final Office Action mailed Jun. 18, 2015, 36 pages.
U.S. Appl. No. 14/095,860, filed Dec. 3, 2013 Notice of Allowance mailed Jul. 13, 2015, 31 pages.
U.S. Appl. No. 14/470,248, filed Aug. 27, 2014, Preinterview first office action mailed Sep. 4, 2015, 22 pages.
U.S. Appl. No. 14/470,279, filed Aug. 27, 2014, Preinterview first office action mailed Aug. 26, 2015, 23 pages.
U.S. Appl. No. 14/479,007, filed Sep. 5, 2014, Non-Final Office Action mailed Sep. 1, 2015, 44 pages.
U.S. Appl. No. 14/139,299, filed Dec. 23, 2013, Non Final Office Action mailed Aug. 14, 2015, 39 pages.
Office Action for EP 14160140.1 mailed Jan. 19, 2016, 5 pages.
International Search Report and Written Opinion for PCT/GB2015/052570 mailed Dec. 11, 2015, 13 pages.
U.S. Appl. No. 14/470,279, filed Aug. 27, 2014, Final Office Action mailed Jan. 22, 2016, 25 pages.
U.S. Appl. No. 14/591,474, filed Jan. 7, 2015, Non-Final Office Action mailed Feb. 12, 2016, 32 pages.
U.S. Appl. No. 14/494,079, filed Sep. 23, 2014, Preinterview first office action mailed Feb. 10, 2016, 6 pages.
U.S. Appl. No. 14/470,248, filed Aug. 27, 2014, Final Office Action mailed Feb. 16, 2016, 26 pages.
International Search Report and Written Opinion for PCT/EP2015/069461 mailed Oct. 1, 2015, 13 pages.

(56) References Cited

OTHER PUBLICATIONS

International Search Report and Written Opinion for PCT/EP2015/069456 mailed Oct. 5, 2015, all pages.
International Preliminary Report on Patentability for PCT/US2014/033796 issued Nov. 3, 2015, all pages.
International Search Report and Written Opinion for PCT/EP2015/069681 mailed Nov. 23, 2015, 12 pages.
U.S. Appl. No. 14/095,860, filed Dec. 3, 2013 Notice of Allowance mailed Oct. 19, 2015, 14 pages.
U.S. Appl. No. 13/919,702, filed Jun. 17, 2013 Final Office Action mailed Dec. 31, 2015, 30 pages.
U.S. Appl. No. 14/071,613, filed Nov. 4, 2013 Final Office Action mailed Oct. 8, 2015, 11 pages.
U.S. Appl. No. 14/470,415, filed Aug. 27, 2014 Non Final Office Action mailed Nov. 18, 2015, 28 pages.
U.S. Appl. No. 13/942,451, filed Jul. 15, 2013 Non Final Office Action mailed Jan. 8, 2016, 41 pages.
U.S. Appl. No. 14/479,007, filed Sep. 5, 2014, Final Office Action mailed Feb. 22, 2016, 37 pages.
U.S. Appl. No. 14/139,299, filed Dec. 23, 2013, Final Office Action mailed Feb. 25, 2016, all pages.
U.S. Appl. No. 14/139,420, filed Dec. 23, 2013 Notice of Allowance mailed Mar. 31, 2016, 37 pages.
U.S. Appl. No. 14/470,415, filed Aug. 27, 2014 Final Office Action mailed Mar. 3, 2016, all pages.
U.S. Appl. No. 15/195,527, filed Jun. 28, 2016, Non-Final Rejection mailed Sep. 30, 2016, all pages.
U.S. Appl. No. 13/942,451, filed Jul. 15, 2013 Non Final Office Action mailed Oct. 25, 2016, all pages.
U.S. Appl. No. 13/919,702, filed Jun. 17, 2013 Final Office Action mailed Oct. 28, 2016, all pages.
International Search Report and Written Opinion for PCT/GB2015/052456 mailed Jun. 13, 2016, all pages.
U.S. Appl. No. 14/470,248, filed Aug. 27, 2014, Non Final Office Action mailed Jul. 25, 2016, all pages.
U.S. Appl. No. 14/479,007, filed Sep. 5, 2014, Non-Final Office Action mailed Jul. 27, 2016, 37 pages.
U.S. Appl. No. 13/942,451, filed Jul. 15, 2013 Final Office Action mailed Jun. 22, 2016, all pages.
U.S. Appl. No. 13/919,702, filed Jun. 17, 2013 Non Final Office Action mailed Jun. 30, 2016, all pages.
U.S. Appl. No. 14/139,299, filed Dec. 23, 2013, Non Final Office Action mailed Jun. 20, 2016, all pages.
U.S. Appl. No. 14/470,415, filed Aug. 27, 2014 Non Final Office Action mailed Jul. 29, 2016, all pages.
U.S. Appl. No. 14/200,864 filed Mar. 7, 2014 Non-Final Office Action mailed Feb. 18, 2016, 61 pages.
U.S. Appl. No. 14/470,279, filed Aug. 27, 2014, Non Final Office Action mailed Jul. 19, 2016, all pages.
U.S. Appl. No. 14/200,864, filed Mar. 7, 2014 Notice of Allowance mailed Sep. 15, 2016, all pages.

* cited by examiner

TELEVISION RECEIVER-BASED NETWORK TRAFFIC CONTROL

BACKGROUND

The advent of the digital video recorder and the availability of high-capacity and affordable computer-readable storage devices have made available many possibilities to television programming service providers and viewers alike. In addition, television viewers have come to expect flexibility and convenience with respect to the management of network content transferred via their television receivers acting as a broadband-enabled gateway device.

SUMMARY

In an aspect, a method may include or comprise: monitoring, by a television receiver in a home network environment, packet traffic routed by the television receiver to a particular system external the home network environment; scanning, by the television receiver, packets of the packet traffic to identify data unauthorized for transfer to the particular system external the home network environment; and blocking particular packets of the packet traffic upon identifying data unauthorized for transfer to the particular system external the home network environment.

In an aspect, a television receiver may include or comprise at least one processor and at least one memory element communicatively coupled with and readable by at least one processor and having stored therein processor-readable instructions. The processor-readable instructions when executed by the at least one processor may cause the at least one processor to at least one of: monitor packet traffic routed by the television receiver to a particular system external a particular home network environment; scan packets of the packet traffic to identify data unauthorized for transfer to the particular system external the particular home network environment; and block particular packets of the packet traffic upon identifying data unauthorized for transfer to the particular system external the particular home network environment.

In an aspect, a method may include or comprise: receiving, by a television receiver, a command to enable monitoring of packet traffic routed by the television receiver to any particular system or device external a home network environment; monitoring, by the television receiver in the home network environment, packet traffic routed by the television receiver to a particular system external the home network environment; scanning, by the television receiver, at least one of a header and a body of packets of the packet traffic to identify data unauthorized for transfer to the particular system external the home network environment; identifying data unauthorized for transfer to the particular system external the home network environment; and blocking particular packets of the packet traffic routed by the television receiver to the particular system external the home network environment.

Other aspects are possible.

DETAILED DESCRIPTION

Figure 1:
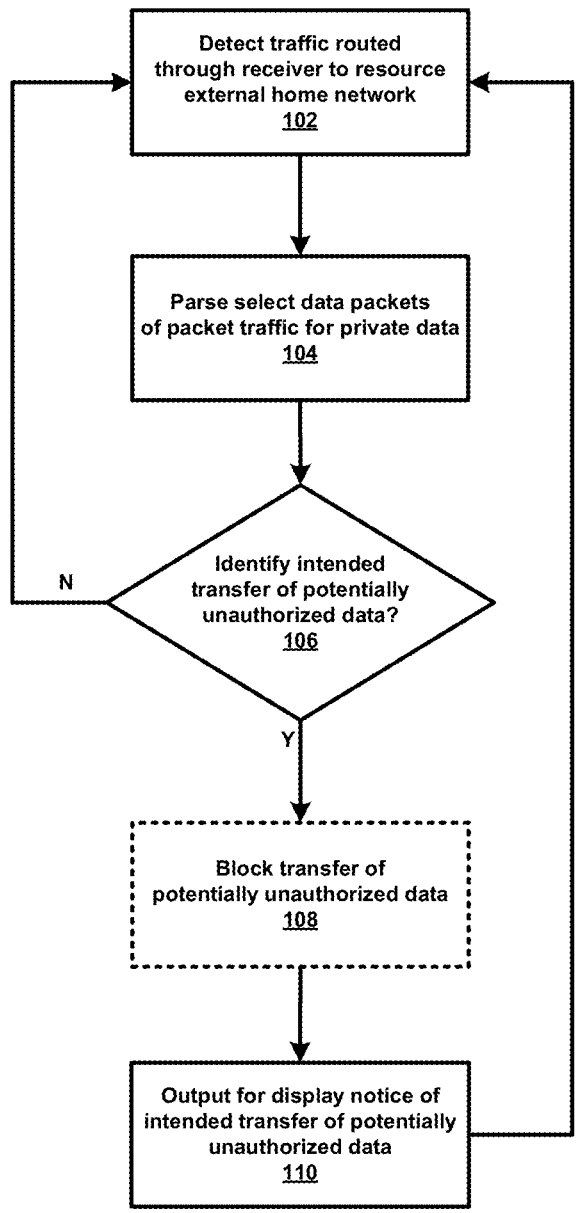
FIG. 1 shows an example method in accordance with the disclosure.

The present disclosure is directed to or towards systems and methods for monitoring data routed by a satellite television receiver that serves as a gateway in a home network. It is contemplated that many different types of actions may be taken depending on the type and/or content of monitored traffic. For example, in the context of privacy control, the television receiver may be configured to detect certain types of data, such as social security or bank numbers, username/password information, device usage information, etc., routed by the same over a broadband connection to one or more resources located outside of the home network, and then implement one or more steps so that a user may be notified and the traffic possibly blocked to prevent or mitigate the unauthorized transfer or reporting of data. Such a feature may, among other things, serve to entice new customers to subscribe to services as offered by a particular satellite television provider, as well as provide an incentive for existing customers to maintain their loyalty and/or relationship with the provider. Although not so limited, an appreciation of the various aspects of the present disclosure may be gained from the following discussion in connection with the drawings. For instance, referring now to FIG. 1, an example method 100 is shown in accordance with the disclosure.

At step 102, a satellite television receiver that serves as a gateway within a particular home network may detect the presence of traffic that is to be routed by the same over a broadband connection to a resource located outside of the home network. For example, a particular device connected to the home network, such as a television or printer for instance, may be configured or programmed to periodically report information related to usage to a delocalized server associated with a manufacturer of the particular device. In this example, it is contemplated that all broadband traffic passes through and is routed by the receiver prior to transfer to resources external the home network. Such an implementation may be preferred by a particular satellite television provider, who would then be able to provide as an enhancement feature data monitoring services as discussed throughout the present disclosure, in addition to satellite television services.

At step 104, the satellite television receiver may parse or otherwise analyze packets of the traffic that is to be routed by the receiver to the resource located outside of the home network. For example, the receiver may be configured to scan at least one of the packets so as to prevent the unauthorized transfer or reporting of data, possibly private, to the resource located outside of the home network. In this example, it is contemplated that this may be performed by the receiver in any of a number of different ways. For example, one or both of a header and body of a particular packet may be parsed and examined for data that may be considered private, confidential, and/or sensitive. Further, the analysis or examination may be performed in a serial manner, such as in a FIFO (First-In First-Out) implementation where a particular packet may be scanned immediately prior to transfer of the same to the external resource. Alternatively, the analysis or examination may be performed in a parallel manner, where a mirror copy of a particular packet may be created and scanned either prior to or concurrently with the transfer of the packet to the external resource. Other examples are possible.

At step 106, a determination may be made as to whether or not packets of the traffic that is to be routed by the satellite television receiver to the resource located outside of the home network contains what may be considered private, confidential, and/or sensitive data. Such data as discussed in the context of the present disclosure may in at least one embodiment be defined as such by a particular user or individual. Such a feature or aspect is discussed in detail below. When it is determined that the traffic that is to be routed by the receiver to the resource located outside of the home network does not include what may be considered private, confidential, and/or sensitive data, process flow within the method 100 may branch back to step 102. Accordingly, it is contemplated that the method 100 may be continuously implemented or performed so at to prevent the unauthorized transfer or reporting of data to resources external the home network.

When though it is determined that the traffic that is to be routed by the receiver to the resource located outside of the home network does include what may be considered private, confidential, and/or sensitive data, process flow within the method 100 may optionally branch to step 108. In this example, it is contemplated that flow within the method 100 may not necessarily branch to step 108, and instead may branch directly to step 110. In FIG. 1, this is signified or indicated by the intermittent line associated with step 108. There, at step 108, it is contemplated that the receiver may block the traffic that is to be routed by the same to the resource located outside of the home network, so as to prevent the potentially unauthorized transfer or reporting of data to that resource. This may be referred to as a brick-wall security measure. Other examples are possible as discussed in further detail below.

Further, instead of flow within the method 100 branching to step 108 from step 106, flow may branch directly to step 110 from step 106. At step 110, it is contemplated that the receiver may generate and surface a notice to a particular user or individual that is associated with the television receiver, such as for example by virtue of being associated with a customer account of a particular satellite television provider, that may serve as indication that the above-mentioned particular device is at least attempting to transfer or report data, possibly private, to the resource located outside of the home network. Here, it is contemplated that the notice may be an interactive user interface that may allow the particular user or individual to command the receiver to perform one or more steps to address the potential transfer or report of unauthorized data. Such a feature or aspect is discussed in detail below. Process flow within the method 100 may then branch back to step 102. Accordingly, the method 100 may be continuously implemented or performed so at to prevent the unauthorized transfer or reporting of data to resources external the home network. Further scenarios and beneficial aspects associated with the monitoring of network traffic routed by a gateway satellite television receiver are described in detail below in connection with FIGS. 2-8.

Figure 2:
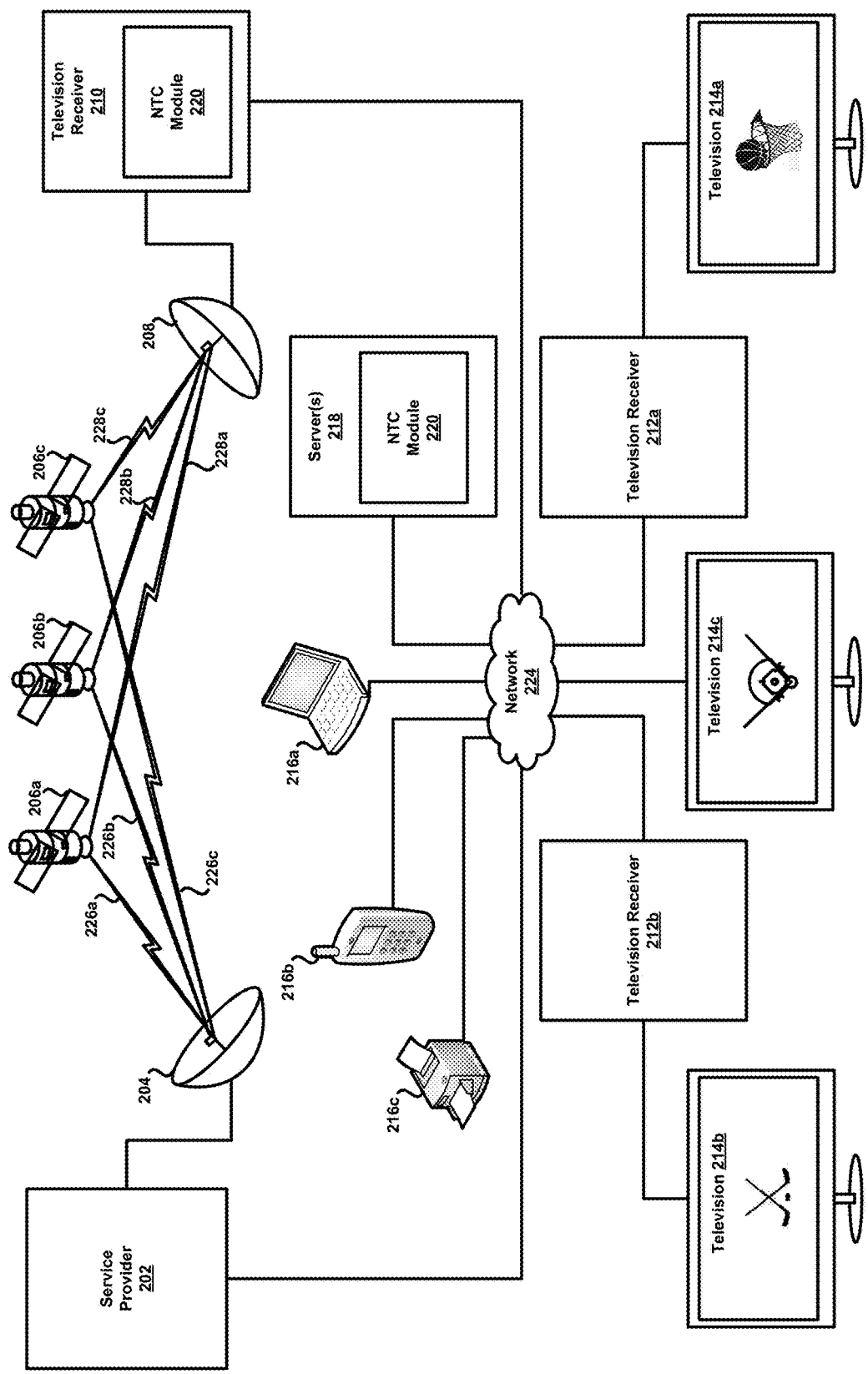
FIG. 2 shows an example satellite television system in accordance with the disclosure.

Referring now to FIG. 2, an example satellite television distribution system 200 is shown in accordance with the present disclosure. For brevity, the system 200 is depicted in a simplified form, and may include more or fewer systems, devices, networks, and/or other components as desired. Further, number and type of features or elements incorporated within the system 200 may or may not be implementation-specific, and at least some of the aspects of the system 200 may be similar to a cable television distribution system, an IPTV (Internet Protocol Television) content distribution system, and/or any other type of content distribution.

The example system 200 may include a service provider 202, a satellite uplink 204, a plurality of satellites 206*a-c*, a satellite dish 208, a PTR (Primary Television Receiver) 210, a plurality of STRs (Secondary Television Receivers) 212*a-b*, a plurality of televisions 214*a-c*, a plurality of computing devices 216*a-c*, and at least one server 218 that may be associated with the service provider 202. Additionally, the PTR 210 and/or server 218 may include an NTC (Network Traffic Control) module 220. In general, the NTC module 220 may be configured and arranged to implement various features associated with monitoring data traffic routed by the PTR 210, that which may serve as a home network gateway.

For example, and as discussed throughout, certain packet traffic may be parsed and/or scanned by the NTC module 220 so as to prevent the unauthorized transfer or reporting of data by the PTR 210 to resources located outside of the home network. In this manner, the various features offered by the NTC module 220 may serve to entice new customers to subscribe to services as offered by a particular satellite television provider, as well as provide an incentive for existing customers to maintain their loyalty and/or relationship with the particular satellite television provider. Still other benefits and/or advantages are possible as well, and an appreciation of such benefits and/or advantages may be understood in light of the present disclosure in its entirety.

The system 200 may further include at least one network 224 that establishes a bidirectional communication path for data transfer between and among each respective element of the system 200, outside or separate from the unidirectional satellite signaling path. The network 224 is intended to represent any number of terrestrial and/or non-terrestrial network features or elements. For example, the network 224 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, or any other type of communication network configured such that data may be transferred between and among respective elements of the system 200.

The PTR 210, and the STRs 212*a-b*, as described throughout may generally be any type of television receiver, television converter, etc., such as a STB for example. In another example, the PTR 210, and the STRs 212*a-b*, may exhibit functionality integrated as part of or into a television, a DVR (Digital Video Recorder), a computer such as a tablet computing device, or any other computing system or device, as well as variations thereof. Further, the PTR 210 and the network 224, together with the STRs 212*a-b* and televisions 214*a-c*, and possibly the computing devices 216*a-c*, may each be incorporated within or form at least a portion of a particular home computing network. Further, the PTR 210 may be configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), etc. Other examples are possible. For example, one or more of the various elements or components of the example system 200 may be configured to communicate in accordance with the MoCA® (Multimedia over Coax Alliance) home entertainment networking standard. Still other examples are possible.

In practice, the satellites 206a-c may each be configured to receive uplink signals 226a-c from the satellite uplink 204. In this example, each the uplink signals 226a-c may contain one or more transponder streams of particular data or content, such as one or more particular television channels, as supplied by the service provider 202. For example, each of the respective uplink signals 226a-c may contain various media content such as encoded HD (High Definition) television channels, SD (Standard Definition) television channels, on-demand programming, programming information, and/or any other content in the form of at least one transponder stream, and in accordance with an allotted carrier frequency and bandwidth. In this example, different media content may be carried using different ones of the satellites 206a-c.

Further, different media content may be carried using different transponders of a particular satellite (e.g., satellite 206a); thus, such media content may be transmitted at different frequencies and/or different frequency ranges. For example, a first and second television channel may be carried on a first carrier frequency over a first transponder of satellite 206a, and a third, fourth, and fifth television channel may be carried on second carrier frequency over a first transponder of satellite 206b, or, the third, fourth, and fifth television channel may be carried on a second carrier frequency over a second transponder of satellite 206a, and etc. Each of these television channels may be scrambled such that unauthorized persons are prevented from accessing the television channels.

The satellites 206a-c may further be configured to relay the uplink signals 226a-c to the satellite dish 208 as downlink signals 228a-c. Similar to the uplink signals 226a-c, each of the downlink signals 228a-c may contain one or more transponder streams of particular data or content, such as various encoded and/or at least partially electronically scrambled television channels, on-demand programming, etc., in accordance with an allotted carrier frequency and bandwidth. The downlink signals 228a-c, however, may not necessarily contain the same or similar content as a corresponding one of the uplink signals 226a-c. For example, the uplink signal 226a may include a first transponder stream containing at least a first group or grouping of television channels, and the downlink signal 228a may include a second transponder stream containing at least a second, different group or grouping of television channels. In other examples, the first and second group of television channels may have one or more television channels in common. In sum, there may be varying degrees of correlation between the uplink signals 226a-c and the downlink signals 228a-c, both in terms of content and underlying characteristics.

Further, satellite television signals may be different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO®, CBS®, ESPN®, and etc. Further, the term "channel," may in some contexts carry a different meaning from or than its normal plain language meaning. For example, the term "channel" may denote a particular carrier frequency or sub-band which can be tuned to by a particular tuner of a television receiver. In other contexts though, the term "channel" may refer to a single program/content service such as HBO®.

Additionally, a single satellite may typically have multiple transponders (e.g., 32 transponders) each one broadcasting a channel or frequency band of about 24-27 MHz in a broader frequency or polarity band of about 500 MHz. Thus, a frequency band of about 500 MHz may contain numerous sub-bands or channels of about 24-27 MHz, and each channel in turn may carry a combined stream of digital data comprising a number of content services. For example, a particular hypothetical transponder may carry HBO®, CBS®, ESPN®, plus several other channels, while another particular hypothetical transponder may itself carry 3, 4, 5, 6, etc., different channels depending on the bandwidth of the particular transponder and the amount of that bandwidth occupied by any particular channel or service on that transponder stream. Further, in many instances a single satellite may broadcast two orthogonal polarity bands of about 500 MHz. For example, a first polarity band of about 500 MHz broadcast by a particular satellite may be left-hand circular polarized, and a second polarity band of about 500 MHz may be right-hand circular polarized. Other examples are possible.

Continuing with the example scenario, the satellite dish 208 may be provided for use to receive television channels (e.g., on a subscription basis) provided by the service provider 202, satellite uplink 204, and/or satellites 206a-c. For example, the satellite dish 208 may be configured to receive particular transponder streams, or downlink signals 228a-c, from one or more of the satellites 206a-c. Based on the characteristics of the PTR 210 and/or satellite dish 208, however, it may only be possible to capture transponder streams from a limited number of transponders concurrently. For example, a particular tuner of the PTR 210 may be configured to tune to a single transponder stream from a transponder of a single satellite at a time.

Additionally, the PTR 210, which is communicatively coupled to the satellite dish 208, may subsequently select via tuner, decode, and relay particular transponder streams to the television 214c for display thereon. For example, the satellite dish 208 and the PTR 210 may, respectively, be configured to receive, decode, and relay at least one premium HD-formatted television channel to the television 214c. Programming or content associated with the HD channel may generally be presented live, or from a recording as previously stored on, by, or at the PTR 210. Here, the HD channel may be output to the television 214c in accordance with the HDMI/HDCP content protection technologies. Other examples are however possible.

Further, the PTR 210 may select via tuner, decode, and relay particular transponder streams to one or both of the STRs 212a-b, which may in turn relay particular transponder streams to a corresponding one of the televisions 214a-b for display thereon. For example, the satellite dish 208 and the PTR 210 may, respectively, be configured to receive, decode, and relay at least one television channel to the television 214a by way of the STR 212a. Similar to the above-example, the television channel may generally be presented live, or from a recording as previously stored on the PTR 210, and may be output to the television 214a by way of the STR 212a in accordance with a particular content protection technology and/or networking standard. Still further, the satellite dish 208 and the PTR 210 may, respectively, be configured to receive, decode, and relay at least one premium television channel to one or more of the computing device 216a-c. Similar to the above-examples, the television channel may generally be presented live, or from a recording as previously stored on the PTR 210, and may be output to one or both of the computing devices 216a-c in accordance with a particular content protection technology and/or networking standard.

Figure 3:
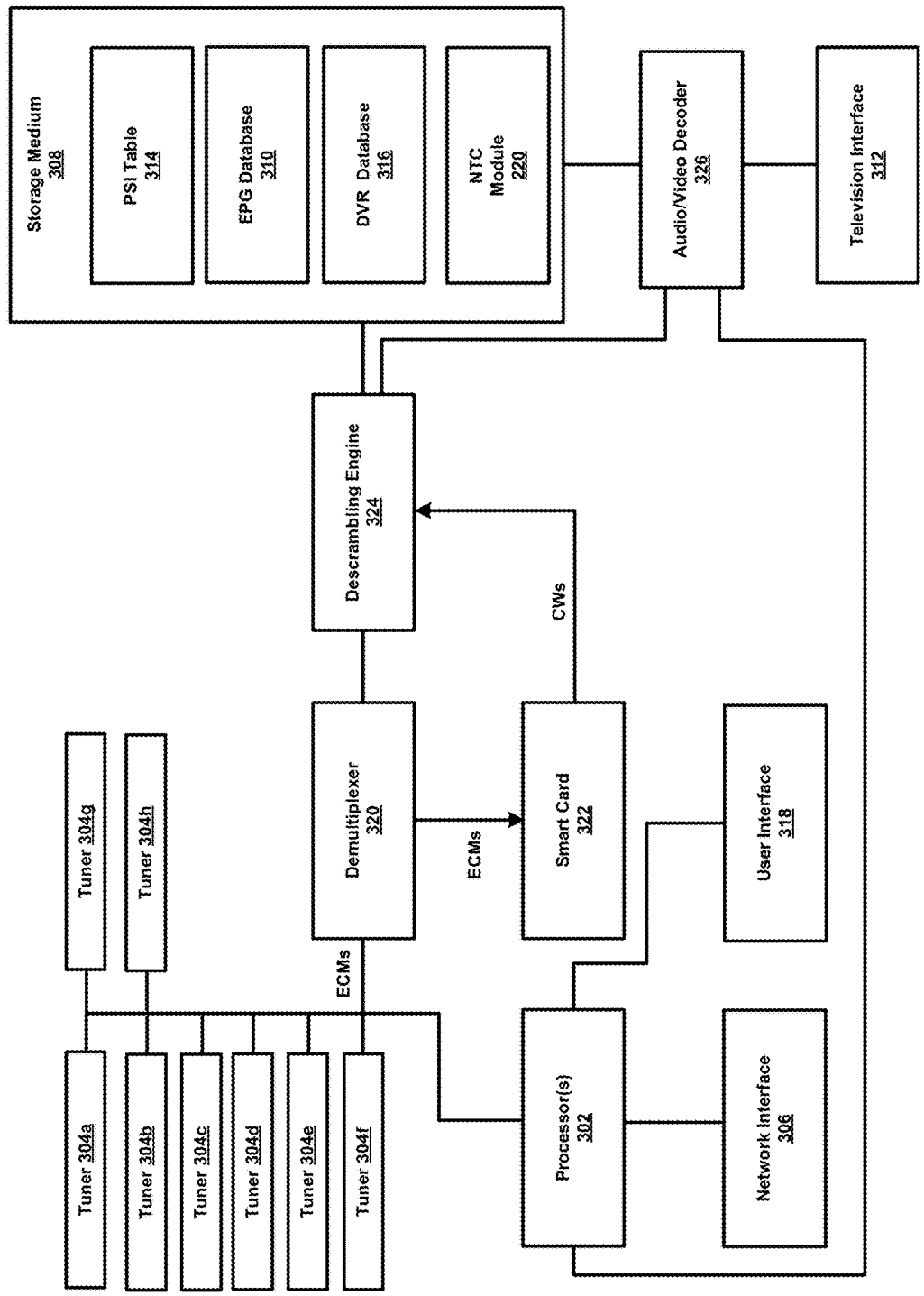
FIG. 3 shows an example block diagram of a television receiver of FIG. 2.

Referring now to FIG. 3, an example block diagram of the PTR 210 of FIG. 2 is shown in accordance with the disclosure. In some examples, STRs 312a-b may be configured in a manner similar to that of the PTR 210. In some examples, the STRs 312a-b may be configured and arranged to exhibit a reduced functionality as compared to the PTR 210, and may depend at least to a certain degree on the PTR 210 to implement certain features or functionality. The STRs 312a-b in this example may be each referred to as a "thin client."

The PTR 210 may include one or more processors 302, a plurality of tuners 304a-h, at least one network interface 306, at least one non-transitory computer-readable storage medium 308, at least one EPG (Electronic Programming Guide) database 310, at least one television interface 312, at least one PSI (Program Specific Information) table 314, at least one DVR database 316, at least one user interface 318, at least one demultiplexer 320, at least one smart card 322, at least one descrambling engine 324, and at least one decoder 326. In other examples, fewer or greater numbers of components may be present. Further, functionality of one or more components may be combined; for example, functions of the descrambling engine 324 may be performed by the processors 302. Still further, functionality of components may be distributed among additional components, and possibly additional systems such as, for example, in a cloud-computing implementation.

The processors 302 may include one or more specialized and/or general-purpose processors configured to perform processes such as tuning to a particular channel, accessing and displaying EPG information, and/or receiving and processing input from a user. For example, the processors 302 may include one or more processors dedicated to decoding video signals from a particular format, such as according to a particular MPEG (Motion Picture Experts Group) standard, for output and display on a television, and for performing or at least facilitating decryption or descrambling.

The tuners 304a-h may be used to tune to television channels, such as television channels transmitted via satellites 306a-c. Each one of the tuners 304a-h may be capable of receiving and processing a single stream of data from a satellite transponder, or a cable RF channel, at a given time. As such, a single tuner may tune to a single transponder or, for a cable network, a single cable channel. Additionally, one tuner (e.g., tuner 304a) may be used to tune to a television channel on a first transponder stream for display using a television, while another tuner (e.g., tuner 304b) may be used to tune to a television channel on a second transponder for recording and viewing at some other time. If multiple television channels transmitted on the same transponder stream are desired, a particular tuner (e.g., tuner 304c) may be used to receive the signal containing the multiple television channels for presentation and/or recording of each of the respective multiple television channels, such as in a PTAT (Primetime Anytime) implementation for example. Although eight tuners are shown, the PTR 210 may include more or fewer tuners (e.g., three tuners, twelve tuners, etc.), and the features of the disclosure may be implemented similarly and scale according to the number of tuners of the PTR 210.

The network interface 306 may be used to communicate via alternate communication channel(s) with a service provider. For example, the primary communication channel between the service provider 202 of FIG. 2 and the PTR 210 may be via satellites 306a-c, which may be unidirectional to the PTR 210, and an another communication channel between the service provider 202 and the PTR 210, which may be bidirectional, may be via the network 224. In general, various types of information may be transmitted and/or received via the network interface 306.

The storage medium 308 may represent a non-transitory computer-readable storage medium. The storage medium 308 may include memory and/or a hard drive. The storage medium 308 may be used to store information received from one or more satellites and/or information received via the network interface 306. For example, the storage medium 308 may store information related to the EPG database 310, the PSI table 314, and/or the DVR database 316, among other elements or features, such as the NTC module 220 mentioned above. Recorded television programs may be stored using the storage medium 308.

The EPG database 310 may store information related to television channels and the timing of programs appearing on such television channels. Information from the EPG database 310 may be used to inform users of what television channels or programs are available, popular and/or provide recommendations. Information from the EPG database 310 may be used to generate a visual interface displayed by a television that allows a user to browse and select television channels and/or television programs for viewing and/or recording. Information used to populate the EPG database 310 may be received via the network interface 306 and/or via satellites 206a-c of FIG. 2. For example, updates to the EPG database 310 may be received periodically via satellite. The EPG database 310 may serve as an interface for a user to control DVR functions of the PTR 210, and/or to enable viewing and/or recording of multiple television channels simultaneously.

The decoder 326 may convert encoded video and audio into a format suitable for output to a display device. For instance, the decoder 326 may receive MPEG video and audio from the storage medium 308, or the descrambling engine 324, to be output to a television. MPEG video and audio from the storage medium 308 may have been recorded to the DVR database 316 as part of a previously-recorded television program. The decoder 326 may convert the MPEG video and audio into a format appropriate to be displayed by a television or other form of display device and audio into a format appropriate to be output from speakers, respectively. The decoder 326 may be a single hardware element capable of decoding a finite number of television channels at a given time, such as in a time-division arrangement. In the example embodiment, eight television channels may be decoded concurrently or simultaneously.

The television interface 312 output a signal to a television, or another form of display device, in a proper format for display of video and play back of audio. As such, the television interface 312 may output one or more television channels, stored television programming from the storage medium 308, such as television programs from the DVR database 316 and/or information from the EPG database 310 for example, to a television for presentation.

The PSI table 314 may store information used by the PTR 210 to access various television channels. Information used to populate the PSI table 314 may be received via satellite, or cable, through the tuners 304*a-h* and/or may be received via the network interface 306 over the network 224 from the service provider 202 shown in FIG. 2. Information present in the PSI table 314 may be periodically or at least intermittently updated. Information that may be present in the PSI table 314 may include: television channel numbers, satellite identifiers, frequency identifiers, transponder identifiers, ECM PIDs (Entitlement Control Message, Packet Identifier), one or more audio PIDs, and video PIDs. A second audio PID of a channel may correspond to a second audio program, such as in another language. In some examples, the PSI table 314 may be divided into a number of tables, such as a NIT (Network Information Table), a PAT (Program Association Table), a PMT (Program Management Table), etc.

Table 1 below provides a simplified example of the PSI table 314 for several television channels. It should be understood that in other examples, many more television channels may be represented in the PSI table 314. The PSI table 314 may be periodically or at least intermittently. As such, television channels may be reassigned to different satellites and/or transponders, and the PTR 210 may be able to handle this reassignment as long as the PSI table 314 is updated.

TABLE 1

| Channel | Satellite | Transponder | ECM PID | Audio PIDs | Video PID |
|---------|-----------|-------------|---------|------------|-----------|
| 4       | 1         | 2           | 27      | 2001       | 1011      |
| 5       | 2         | 11          | 29      | 2002       | 1012      |
| 7       | 2         | 3           | 31      | 2003       | 1013      |
| 13      | 2         | 4           | 33      | 2003, 2004 | 1013      |

It should be understood that the values provided in Table 1 are for example purposes only. Actual values, including how satellites and transponders are identified, may vary. Additional information may also be stored in the PSI table 314. Video and/or audio for different television channels on different transponders may have the same PIDs. Such television channels may be differentiated based on which satellite and/or transponder to which a tuner is tuned.

DVR functionality of the PTR 210 may permit a television channel to be recorded for a period of time. The DVR database 316 may store timers that are used by the processors 302 to determine when a television channel should be tuned to and recorded to the DVR database 316 of storage medium 308. In some examples, a limited amount of space of the storage medium 308 may be devoted to the DVR database 316. Timers may be set by the service provider 202 and/or one or more users of the PTR 210. DVR functionality of the PTR 210 may be configured by a user to record particular television programs. The PSI table 314 may be used by the PTR 210 to determine the satellite, transponder, ECM PID, audio PID, and video PID.

The user interface 318 may include a remote control, physically separate from PTR 210, and/or one or more buttons on the PTR 210 that allows a user to interact with the PTR 210. The user interface 318 may be used to select a television channel for viewing, view information from the EPG database 310, and/or program a timer stored to the DVR database 316 wherein the timer may be used to control the DVR functionality of the PTR 210.

Referring back to the tuners 304*a-h*, television channels received via satellite may contain at least some encrypted or scrambles data. Packets of audio and video may be scrambled to prevent unauthorized users, such as nonsubscribers, from receiving television programming without paying the service provider 202. When one of the tuners 304*a-h* is receiving data from a particular transponder of a satellite, the transponder stream may be a series of data packets corresponding to multiple television channels. Each data packet may contain a PID, which in combination with the PSI table 314, can be determined to be associated with a particular television channel. Particular data packets, referred to as ECMs may be periodically transmitted. ECMs may be encrypted; the PTR 210 may use the smart card 322 to decrypt ECMs.

The smart card 322 may function as the CA (Controlled Access) which performs decryption of encryption data to obtain control words that are used to descramble video and/or audio of television channels. Decryption of an ECM may only be possible when the user (e.g., an individual who is associated with the PTR 210) has authorization to access the particular television channel associated with the ECM. When an ECM is received by the demultiplexer 320 and the ECM is determined to correspond to a television channel being stored and/or displayed, the ECM may be provided to the smart card 322 for decryption.

When the smart card 322 receives an encrypted ECM from the demultiplexer 320, the smart card 322 may decrypt the ECM to obtain some number of control words. In some examples, from each ECM received by the smart card 322, two control words are obtained. In some examples, when the smart card 322 receives an ECM, it compares the ECM to the previously received ECM. If the two ECMs match, the second ECM is not decrypted because the same control words would be obtained. In other examples, each ECM received by the smart card 322 is decrypted; however, if a second ECM matches a first ECM, the outputted control words will match; thus, effectively, the second ECM does not affect the control words output by the smart card 322. When an ECM is received by the smart card 322, it may take a period of time for the ECM to be decrypted to obtain the control words. As such, a period of time, such as about 0.2-0.5 seconds, may elapse before the control words indicated by the ECM can be obtained. The smart card 322 may be permanently part of the PTR 210 or may be configured to be inserted and removed from the PTR 210.

The demultiplexer 320 may be configured to filter data packets based on PIDs. For example, if a transponder data stream includes multiple television channels, data packets corresponding to a television channel that are not desired to be stored or displayed by the user may be ignored by the demultiplexer 320. As such, only data packets corresponding to the one or more television channels desired to be stored and/or displayed may be passed to either the descrambling engine 324 or the smart card 322; other data packets may be ignored. For each channel, a stream of video packets, a stream of audio packets and/or a stream of ECM packets may be present, each stream identified by a PID. In some examples, a common ECM stream may be used for multiple television channels. Additional data packets corresponding to other information, such as updates to the PSI table 314, may be appropriately routed by the demultiplexer 320.

The descrambling engine 324 may use the control words output by the smart card 322 in order to descramble video and/or audio corresponding to television channels for storage and/or presentation. Video and/or audio data contained in the transponder data stream received by the tuners 304*a-h* may be scrambled. The video and/or audio may be descrambled by the descrambling engine 324 using a particular control word. Which control word output by the smart card 322 to be used for successful descrambling may be indicated by a scramble control identifier present within the data packet containing the scrambled video or audio. Descrambled video and/or audio may be output by the descrambling engine 324 to the storage medium 308 for storage, such as part of the DVR database 316 for example, and/or to the decoder 326 for output to a television or other presentation equipment via the television interface 312.

For brevity, the PTR 210 is depicted in a simplified form, and may generally include more or fewer elements or components as desired, including those configured and/or arranged for implementing various features associated with intelligently allocating idle tuner resources to buffer or record broadcast programming determined as desirable, as discussed in the context of the present disclosure. For example, the PTR 210 is shown in FIG. 3 to include the NTC module 220 as mentioned above in connection with FIG. 2. While shown stored to the storage medium 308 as executable instructions, the NTC module 220 could, wholly or at least partially, be stored to the processor(s) 302 of the PTR 210. Further, some routing between the various modules of PTR 210 has been illustrated. Such illustrations are for exemplary purposes only. The state of two modules not being directly or indirectly connected does not indicate the modules cannot communicate. Rather, connections between modules of the PTR 210 are intended only to indicate possible common data routing. It should be understood that the modules of the PTR 210 may be combined into a fewer number of modules or divided into a greater number of modules.

Additionally, although not explicitly shown in FIG. 3, the PTR 210 may include one or more logical modules configured to implement a television steaming media functionality that encodes video into a particular format for transmission over the Internet such as to allow users to remotely view and control a home cable, satellite, or personal video recorder system from an Internet-enabled computer with a broadband Internet connection. The Slingbox® by Sling Media, Inc. of Foster City, Calif., is one example of a product that implements such functionality. Further, the PTR 210 may be configured to include any number of other various components or logical modules that are implemented in hardware, software, firmware, or any combination thereof, and such components or logical modules may or may not be implementation-specific.

Figure 4:
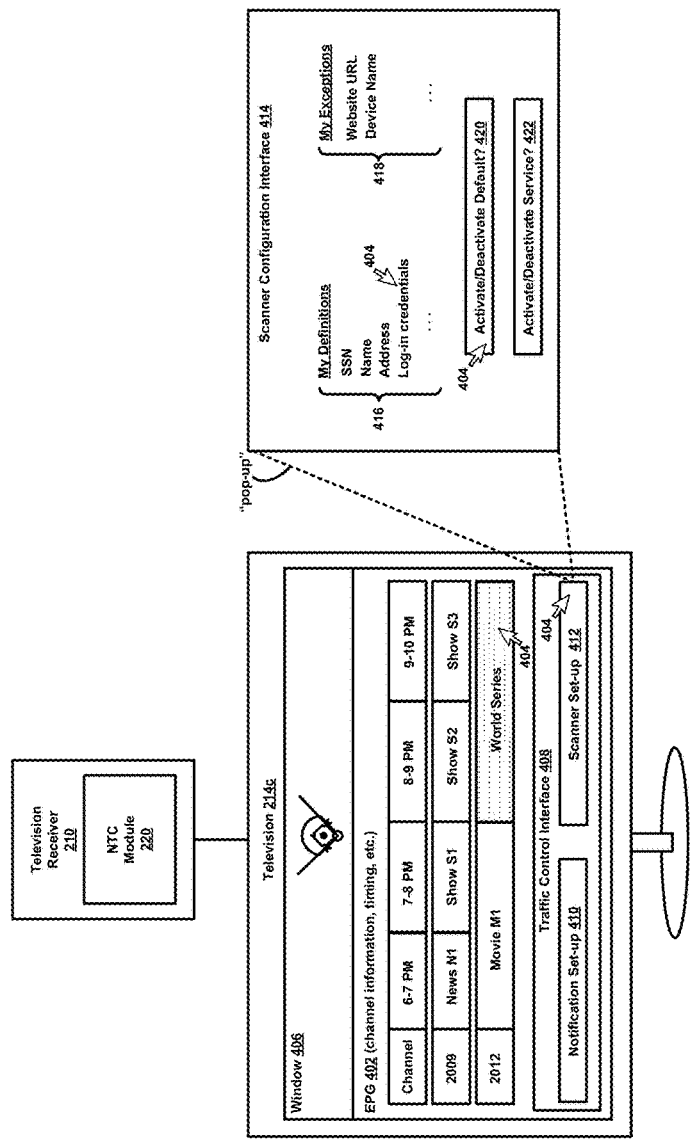
FIG. 4 shows first example aspects of the system of FIG. 2 in detail.

Referring now to FIG. 4, first example aspects of the system 200 of FIG. 2 are shown in detail. In particular, the PTR 210 may be configured to output an EPG (Electronic Programming Guide) 402 to and for presentation the television 214c, for example. The EPG 402 may at least present various information related to television channels and the timing of programs or programming appearing on such television channels. For example, as shown in FIG. 4, the EPG 402 may display information associated with a channel 2012, where the "World Series" is listed as scheduled to appear on that channel starting at a particular time on a particular day, and etc. In this example, and assuming that a current time is sometime during the time period 8-10 PM, a viewer may manipulate a cursor 404 using a pointing device (not shown) to select, as shown by stipple shading in FIG. 4, the World Series for immediate viewing within a window 406 on the television 214c. Other examples are possible. For example, it is contemplated that any menu-driven navigation technique or implementation may be used to enable user-interaction with the EPG 402, along with other elements or interfaces output by the PTR 210 to the television 214c.

In addition to the EPG 402, the PTR 210 may be configured to output various other interactive elements or interfaces configured to enable the features or aspects of the present disclosure associated with monitoring data routed by a satellite television receiver that serves as a gateway in a home network. For example, as shown in FIG. 4, the NTC module 220 may be configured to output a traffic control interface 408 that includes a notification set-up selection 410 and a scanner set-up selection 412. In general, the notification set-up selection 410 may be optionally selected so as to allow a particular user or individual to configure or customize the NTC module 220 to surface a particular notice or notification when a particular device (e.g., computing device 216c of FIG. 2) is at least attempting to transfer or report data, possibly private, to a resource located outside of the home network. Here, it is contemplated that the notice may be an interactive user interface that may allow the user or individual to command the NTC module 220 to perform one or more steps to address the potential transfer or report of unauthorized data, as discussed in further detail below.

Similarly, the scanner set-up selection 412 may be optionally selected so as to allow a particular user or individual to configure or customize the NTC module 220 to look or otherwise scan for data within particular packet traffic that might be considered private, confidential, and/or sensitive. For example, as shown in FIG. 4, a viewer may manipulate the cursor 404 to select the scanner set-up selection 412 via a "point and double-click" action using a remote control for example and, in response, the NTC module 220 may be configured to output an scanner configuration interface 414 to and for presentation by the television 214c.

In this example, the scanner configuration interface 414 may include a definitions section 416 and an exceptions section 418. In the definitions section 416, a particular user may enter data considered by the user to be private, confidential, and/or sensitive. For example, the user may enter within the definitions section 416 their own social security number, first, middle, and/or last name, mailing address, one or more particular set of log-in credentials such as a username/password combination, and etc. Accordingly, it is contemplated that essentially any information may be entered within the definitions section 416, and further that that information does not necessarily have to be specific in the sense as shown in FIG. 4. For example, it is contemplated that a Boolean expression, an if/then statement (e.g., if=>10 consecutive digits—as might be in a phone number—then flag), and/or any other syntax that may be used by the NTC module 220 to look or otherwise scan for data within particular packet traffic that might be considered private, confidential, and/or sensitive may be entered within definitions section 416.

Similarly, in the exceptions section 418, a particular user may enter particular data that is not but might otherwise be considered by the user to be private, confidential, and/or sensitive. For example, the user may enter within the exceptions section 418 a particular website address such as "www.gmail.com" and/or variants thereof, a particular device name or identifier such as "my smartphone" or a unique identifier of the same, and etc. Accordingly, it is contemplated that essentially any information may be entered within the exceptions section 418, and further that information does not necessarily have to be specific in the sense as shown in FIG. 4. For example, it is contemplated that a Boolean expression, an if/then statement (e.g., if<=9 consecutive digits—as might be in a social security—then don't flag), and/or any other syntax that may be used by the NTC module 220 to look or otherwise scan for data within particular packet traffic that is not but might otherwise be considered by the user to be private, confidential, and/or sensitive within the exceptions section 418.

The scanner configuration interface 414 may further include an engage default selection 420 and an engage service selection 422. In this example, with respect to the engage default selection 420, it is contemplated that the NTC module 220 may periodically or at least intermittently be updated by an external resource (e.g. server 218 of FIG. 2) with certain rules that may be used to identify data that might normally or commonly be considered private, confidential, and/or sensitive when considered across a relatively large sample set, such as across a customer base of a particular satellite television provider. A simplified example of such a rule may include "if=9 consecutive digits (as might be in a social security) then flag." It will be appreciated that many other examples are possible as well. Accordingly, when the engage default selection 420 is selected, the NTC module 220 may be activated to look or otherwise scan for data within particular packet traffic that might be considered private, confidential, and/or sensitive per the above-mentioned "default" rules. Advantageously, this may alleviate some of the pressure that may be placed upon a particular user to "cover all bases" when entering data in to the definitions section 416. Further, with respect to the engage service selection 422, it is contemplated that this selection when selected generally activates the NTC module 220 to implement the various features or aspects of the present disclosure.

Figure 5:
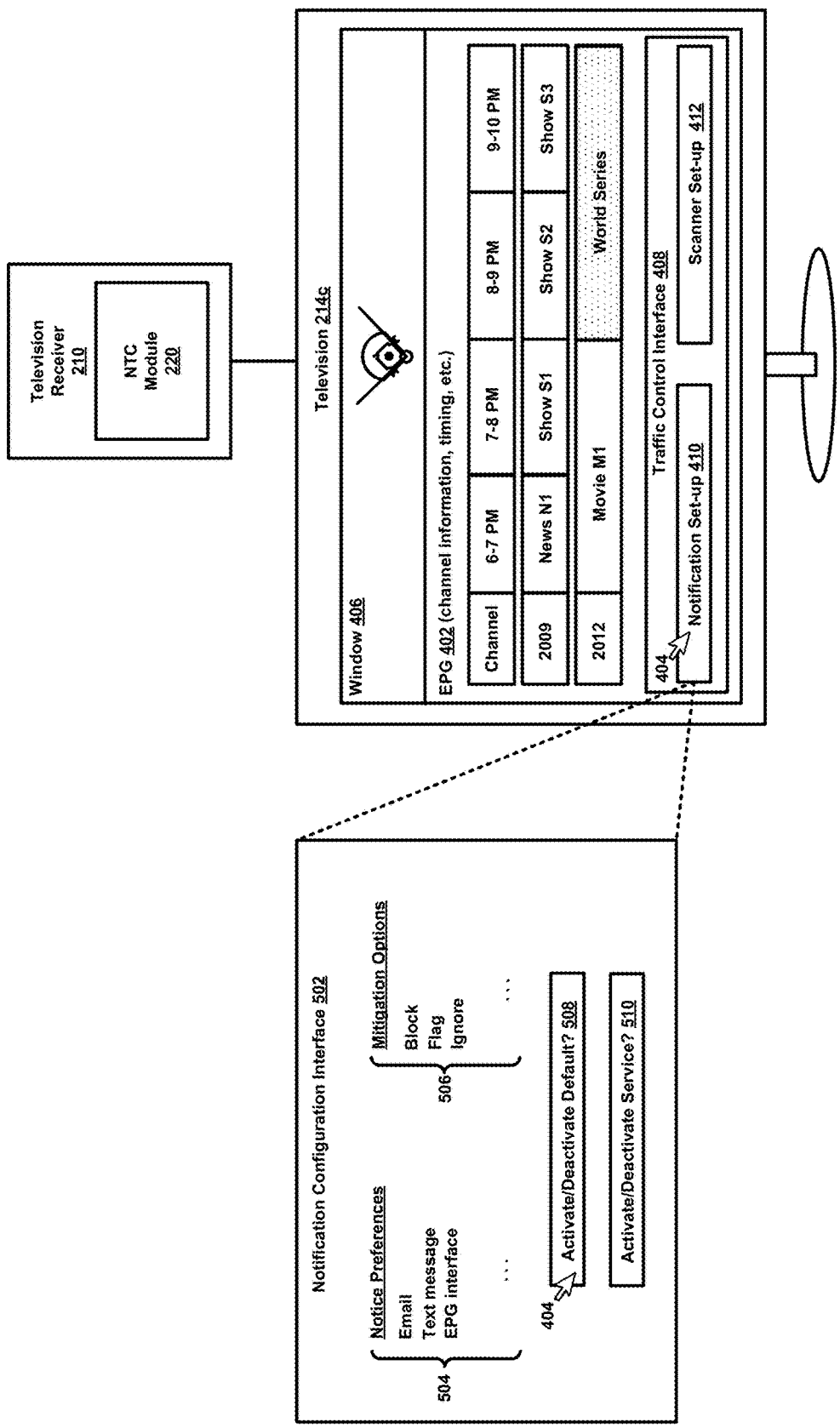
FIG. 5 shows second example aspects of the system of FIG. 2 in detail.

Referring now to FIG. 5, second example aspects of the system 200 of FIG. 2 are shown in detail. In particular, and as mentioned above, the NTC module 220 may be configured to output a traffic control interface 408 that includes a notification set-up selection 410. In general, the notification set-up selection 410 may be optionally selected so as to allow a particular user or individual to configure or customize the NTC module 220 to surface a particular notice or notification when a particular device (e.g., computing device 216c of FIG. 2) is at least attempting to transfer or report data, possibly private, to a resource located outside of the home network. Here, it is contemplated that the notice may be an interactive user interface that may allow a user to command the NTC module 220 to perform one or more steps to address the potential transfer or report of unauthorized data.

For example, as shown in FIG. 5, a viewer may manipulate the cursor 404 to select the notification set-up selection 410 via a "point and single-click" action using a remote control for example and, in response, the NTC module 220 may be configured to output a notification configuration interface 502 to and for presentation by the television 214c. In this example, the notification configuration interface 502 may at least include a preferences section 504 and a mitigation section 506.

In the preferences section 504, a particular user may enter data and/or select one or more pre-existing options for or by which to be notified when the NTC module 220 has identified particular packet traffic that might be considered private, confidential, and/or sensitive. For example, the particular user may enter a personal and/or work email address or alias within the preferences section 504. Additionally, or alternatively, the particular user may enter one or more SMS addresses within the preferences section 504. Additionally, or alternatively, the particular user may select a pre-existing option whereby a notice may be generated by the NTC module 220 for display by a television or smartphone (e.g., computing devices 216a-b of FIG. 2) in an EPG type interface when the NTC module 220 has identified particular packet traffic that might be considered private, confidential, and/or sensitive. Still many other examples are possible as well, and it is contemplated that the actual mode(s) by which a user is notified as discussed in connection with at least FIG. 5 may change or evolve as technology evolves.

In the mitigation section 506, a particular user may enter data and/or select one or more pre-existing options for inclusion within the above-mentioned notification to prevent or mitigate the unauthorized transfer or reporting of data, when the NTC module 220 has identified particular packet traffic that might be considered private, confidential, and/or sensitive, as discussed throughout. For example, as shown in FIG. 5, the particular user may enter a command "Block" that may be presented as a selection within the above-mentioned notification and when selected by a user may instantiate the NTC module 220 to "block" all associated traffic routed by the PTR 210, such as discussed in further detail below in connection with FIG. 6. Other options such as shown in FIG. 5 may include for example a "Flag" option and an "Ignore" option. Still many other examples are possible as well. For example, a "Quarantine" option may be available and it is contemplated that the options may change or evolve as technology evolves.

The notification configuration interface 502 may further include a default selection 508 and a service selection 510. It is contemplated that these two selections may in general be similar to that discussed above in connection with the engage default selection 420 and engage service selection 422 of FIG. 4. For example, with respect to the default selection 508, it is contemplated that the NTC module 220 may periodically or at least intermittently be updated by an external resource (e.g. server 218 of FIG. 2) with certain rules or options that may be presented within one or both of the preferences section 504 and a mitigation section 506 when the default selection 508 is selected so as to activate this feature. In general, such options may be customized on a per-user basis, based on the needs or desires of any particular individual or customer, and/or may be more sweeping such as based on activities or options used across a relatively large sample set, such as across a customer base of a particular satellite television provider.

For example, as mobile applications become more and more prevalent, a "default" option may be presented within the preferences section 504 that calls-out "Mobile Application" so that a particular user may be notified by a particular mobile application on their smartphone, when the NTC module 220 has identified particular packet traffic that might be considered private, confidential, and/or sensitive. Still many other examples are possible. Further, with respect to the service selection 510, it is contemplated that this feature when selected generally activates the NTC module 220 to implement the various features or aspects of the present disclosure associated with notification and mitigation, as discussed in further detail in connection with at least FIG. 6.

Figure 6:
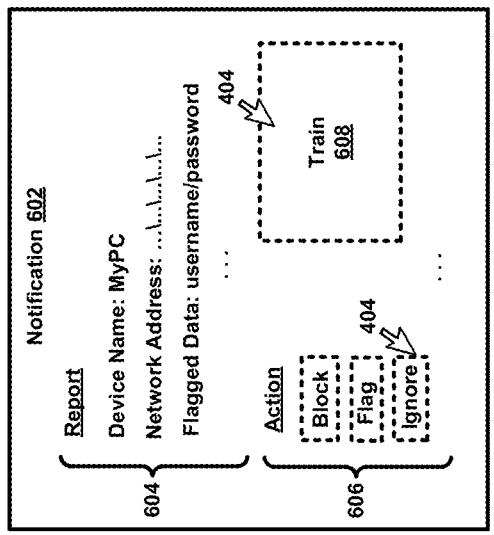
FIG. 6 shows third example aspects of the system of FIG. 2 in detail.

For example, referring now to FIG. 6, third example aspects of the system 200 of FIG. 2 are shown in detail. In particular, an example notification 602 is shown that may be presented to a particular user or individual when a particular device (e.g., computing device 216c of FIG. 2) is at least attempting to transfer or report data, possibly private, to a resource located outside of a home network. In an aspect, the notification 602 may be generated by the NTC module 220 in a particular manner so as to conform with the method by which the notification 602 is presented, e.g., via presentation by email, text message, within an EPG, etc. In another aspect, the example notification 602 may be an interactive user interface that may present salient information while also allowing the user or individual to command the NTC module 220 to perform one or more steps to address the potential transfer or report of unauthorized data.

For example, as shown in FIG. 6, the notification 602 may include a report section 604 and an action section 606. In general, information within the report section 604 may be derived by the NTC module 220 by various means such as from one or more particular data packets (e.g., from packet header(s) and/or packet body(s)) and/or from network information derived from diagnostics performed by the NTC module 220 to identify particular devices as they are connected/disconnected from the home network. For example, and in keeping with the steps of the method 100 of FIG. 1, the NTC module 220 may identify one or more instances of a particular device attempting to pass to an external resource data that may be considered private, confidential, and/or sensitive. In response, the NTC module 220 may generate the notification 602 and populate the report section 604 with information such as "Device Name" and "Network Address" and "Flagged Data" such as shown in FIG. 6. Additionally, the NTC module 220 may populate the action section 606 in light of any configuration and/or customization information present within the notification configuration interface 502 as discussed above.

For example, the NTC module 220 may generate the notification 602 and populate the action section 606 with selectable icons such as "Block" and "Flag" and "Ignore" as shown in FIG. 6. Those icons are indicated as "selectable" in FIG. 6 by the intermittent lines associated with each respective one of those icons. Accordingly, it is contemplated that a particular user of individual may come to a quick understanding of the type and content of data identified by the NTC module 220 as potentially private, confidential, and/or sensitive, and then command the NTC module 220 to implement one or more actions to prevent or mitigate the potentially unauthorized transfer or reporting of data. For example, the particular user or individual may determine that the "username/password" data presented within the notification 602 does present a threat or potential security or privacy breach, and then select the "Block" icon within the action section 606 to immediately stop or prevent all transmissions from the device "MyPC" to an external resource(s) as routed by the PTR 210.

As another example, the particular user or individual may determine that the "username/password" data presented within the notification 602 may or may not (i.e., undecided) present a threat or potential security or privacy breach, and then select the "Flag" icon within the action section 606 to command to the NTC module 220 to closely watch and log and provide to the particular user information associated with all transmissions from the device "MyPC" to an external resource(s) as routed by the PTR 210. In still another example, the particular user or individual may determine that the "username/password" data presented within the notification 602 does not present a threat or potential security or privacy breach, and then select the "Ignore" icon within the action section 606. In each of those examples, it is contemplated that selections within the action section 606 may serve to "train" the NTC module 220 so that the NTC module 220 may "learn" user-preferences based upon user-input. For example, a train icon 608 may be presented within the notification 602 that when selected commands the NTC module 220 on a per-action or per-event basis to "remember" the selection of the "Block" icon or the "Flag" icon "Ignore" icon so that in the future when the NTC module 220 derives information the same or at least partially similar to that shown in the report section 604 in FIG. 6, another notification similar to notification 602 may not be unnecessarily generated and surfaced to a user for consideration.

Figure 7:
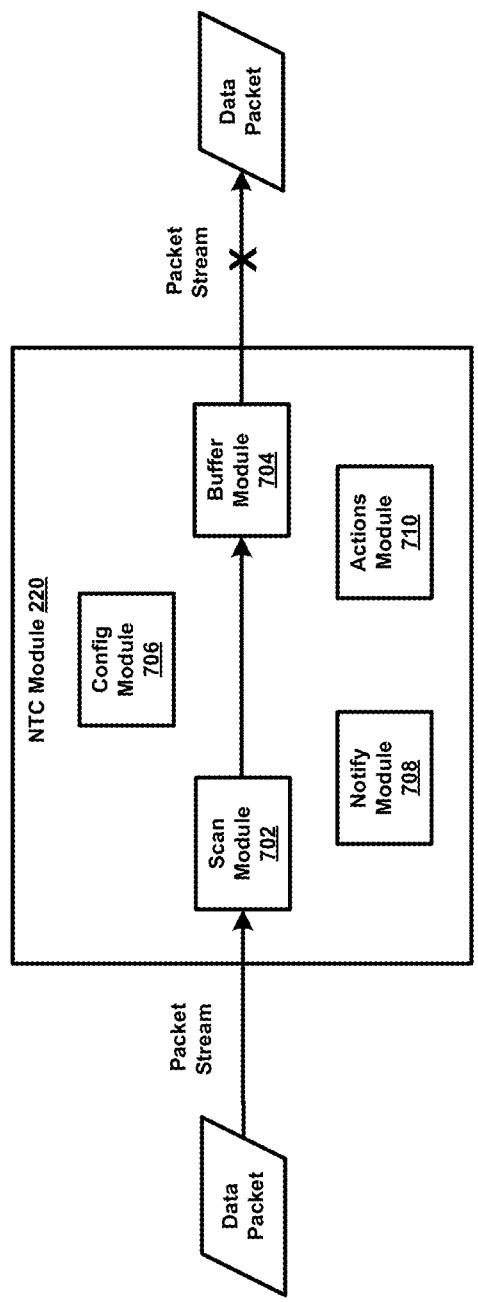
FIG. 7 shows fourth example aspects of the system of FIG. 2 in detail.

Referring now to FIG. 7, fourth example aspects of the system 200 of FIG. 2 are shown in detail. In particular, the NTC module 220 of FIG. 2 is shown to include a scan module 702, a buffer module 704, a configuration module 706, a notification module 708, and an actions module 710. In general, the respective modules of the NTC module 220, and thus the NTC module 220 itself, includes or comprises logical modules of software, firmware, or hardware, or any combination thereof, configured and arranged to implement various features associated with monitoring data traffic routed by the PTR 210, that which may serve as a home network gateway. In particular, the NTC module 220 may be configured and arranged to parse and/or scan certain packet traffic so as to prevent the unauthorized transfer or reporting of data via the PTR 210 to resources located outside of the home network.

For example, the scan module 702 may in practice parse or otherwise analyze particular data packets of a stream of data traffic that is to be routed by the PTR 210 to a resource located outside of the home network. Specifically, the scan module 702 may be configured to scan at least one of the packets so as to prevent the unauthorized transfer or reporting of data, possibly private, to the resource located outside of the home network. In this example, it is contemplated that this may be performed by the scan module 702 in any of a number of different ways. For example, one or both of a header and body of a particular packet may be parsed and examined for data that may be considered private, confidential, and/or sensitive. Further, the analysis or examination may be performed in a serial manner, such as in a FIFO implementation where a particular packet may be scanned immediately prior to transfer of the same to the external resource. Alternatively, the analysis or examination may be performed in a parallel manner, where a mirror copy of a particular packet may be created and scanned either prior to or concurrently with the transfer of the packet to the external resource.

In each of these examples, the buffer module 704 may be used to "hold" particular data packets until a determination has been made as to whether or not packets of the stream of data traffic that is to be routed by the PTR 210 to the resource located outside of the home network contains what may be considered private, confidential, and/or sensitive data. Such data may in at least one embodiment be defined as such by a particular user or individual, such as discussed above in connection with at least FIG. 4. Here, it is contemplated that the scan module 702 may query the configuration module 706 to enable the scan module 702 to make a determination as to whether data traffic that is to be routed by the PTR 210 to the resource located outside of the home network contains what may be considered private, confidential, and/or sensitive data.

When it is determined by the scan module 702 that the traffic that is to be routed by the PTR 210 to the resource located outside of the home network does not include what may be considered private, confidential, and/or sensitive data, the actions module 710 may command the buffer module 704 to release corresponding data packets stored or held therein. When though it is determined that the traffic that is to be routed by the PTR 210 to the resource located outside of the home network does include what may be considered private, confidential, and/or sensitive data, the actions module 710 may command the buffer module 704 to "hold" in a persistent manner, or otherwise purge, corresponding data packets stored or held therein so as to prevent the unauthorized transfer or reporting of data via the PTR 210 to resources located outside of the home network. This is indicated in FIG. 7 by the "X" shown in the output packet stream.

Further, and as mentioned above, it is contemplated that the NTC module 220 may generate and surface a notice to a particular user or individual that is associated with the television receiver, such as for example by virtue of being associated with a customer account of a particular satellite television provider, that may serve as indication that the above-mentioned particular device is at least attempting to transfer or report data, possibly private, to the resource located outside of the home network. For example, it is contemplated that a notification module 708 may query the configuration module 706 to enable a notification module 708 to generate and send a particular notification (e.g., notification 602) that is an interactive user interface that may allow the particular user or individual to command the PTR 210 to perform one or more steps to address the potential transfer or report of unauthorized data. In this manner, the configuration module 706 may be leveraged as a resource that contains all configuration information as shown and discussed above in connection with FIG. 4 and FIG. 5, and the scan module 702, buffer module 704, configuration module 706, notification module 708, and actions module 710 of the NTC module 220 as shown in FIG. 7 may together implement the feature or aspects of the present disclosure so as to prevent the unauthorized transfer or reporting of data via the PTR 210 to resources located outside of the home network.

As mentioned above, the various features or aspects of the present disclosure are directed to or towards systems and methods for monitoring data routed by a satellite television receiver that serves as a gateway in a home network. In the context of privacy control, the television receiver may be configured to detect certain types of data, such as social security or bank numbers, username/password information, device usage information, etc., routed by the same over a broadband connection to one or more resources located outside of the home network, and then implement one or more steps so that a user may be notified and the traffic possibly blocked to prevent or mitigate the unauthorized transfer or reporting of data. Such a feature may, among other things, serve to entice new customers to subscribe to services as offered by a particular satellite television provider, as well as provide an incentive for existing customers to maintain their loyalty and/or relationship with the provider. These and other benefits and/or advantages may be realized in a number of different ways, including by one or more of the systems, devices, methods, computer-program products, etc., of the present disclosure.

For instance, a method may include or comprise monitoring, by a television receiver in a home network environment, packet traffic routed by the television receiver to a particular system external the home network environment. The particular system may in some instances be considered external the home network environment by virtue of being one or both of physically remote and logically excluded (e.g., unauthorized to access) from the home network environment. The television receiver may in some instances be considered part of or integral to the home network environment by virtue of being one or both of physically within and logically included with the home network environment. For example, the television receiver may in some instances be or function as a home gateway within the home network environment, whereas the particular system may simply be a network-accessible resource that is not part of the home network environment. The method may further include or comprise scanning, by the television receiver, packets of the packet traffic to identify data unauthorized for transfer to the particular system external the home network environment. The television receiver thus may in some instances be configured and/or arranged to acquire and parse individual packets of the packet traffic, and then scan or analyze the same to determine contents of the individual packets of the packet traffic. In some examples, the method may include or comprise scanning at least one of a header and a body of packets of the packet traffic to identify data unauthorized for transfer to the particular system external the home network environment. The method may further include or comprise blocking particular packets of the packet traffic upon identifying data unauthorized for transfer to the particular system external the home network environment. The television receiver thus may in some instances be configured and/or arranged to, based on results of the scanning, prevent all or at least some of the packets of the packet traffic intended to be routed to the particular system external the home network environment from being routed to the particular system external the home network environment.

In some examples, the method may include or comprise generating at least one, or one or more, messages upon identifying data unauthorized for transfer to the particular system external the home network environment. In some examples, this may include sending a message to a particular computing device for display thereon, wherein the message includes an indication of type or form of data unauthorized for transfer to the particular system external the home network environment. In this way, an end-user user may in some examples be informed as to the exact content identified as unauthorized for transfer to the particular system external the home network environment. Other examples are possible. For instance, in some examples, this may include sending a message to a particular computing device for display thereon, wherein the message includes a plurality of selectable icons each when activated generates a particular command to perform a particular function against the data unauthorized for transfer. In this way, an end-user user may in some examples command the television receive to perform a particular action to remedy, mitigate, and/or investigate issues associated with content identified as unauthorized for transfer to the particular system external the home network environment. Other examples are possible.

For instance, in some examples, this may include sending a message to a particular computing device for display thereon, wherein the message includes a network path indication of a source of the particular packets of the packet traffic. In some examples, this may include sending a message to a particular computing device for display thereon, wherein the message includes a network path indication of a source of the particular packets of the packet traffic. In some examples, this may include sending a message to a particular computing device for display thereon, wherein the message includes an alphanumeric identifier of a source of the particular packets of the packet traffic. In some examples, this may include sending a message to a particular computing device for display thereon, wherein the message includes a selectable icon when activated generates a particular command to retain in memory a particular action to implement upon subsequent identification of similar data unauthorized for transfer to the particular system external the home network environment. In this way, in each of these examples, an end-user user may command the television receive to perform a particular action to remedy, mitigate, and/or investigate issues associated with content identified as unauthorized for transfer to the particular system external the home network environment. Other examples are possible.

Figure 8:
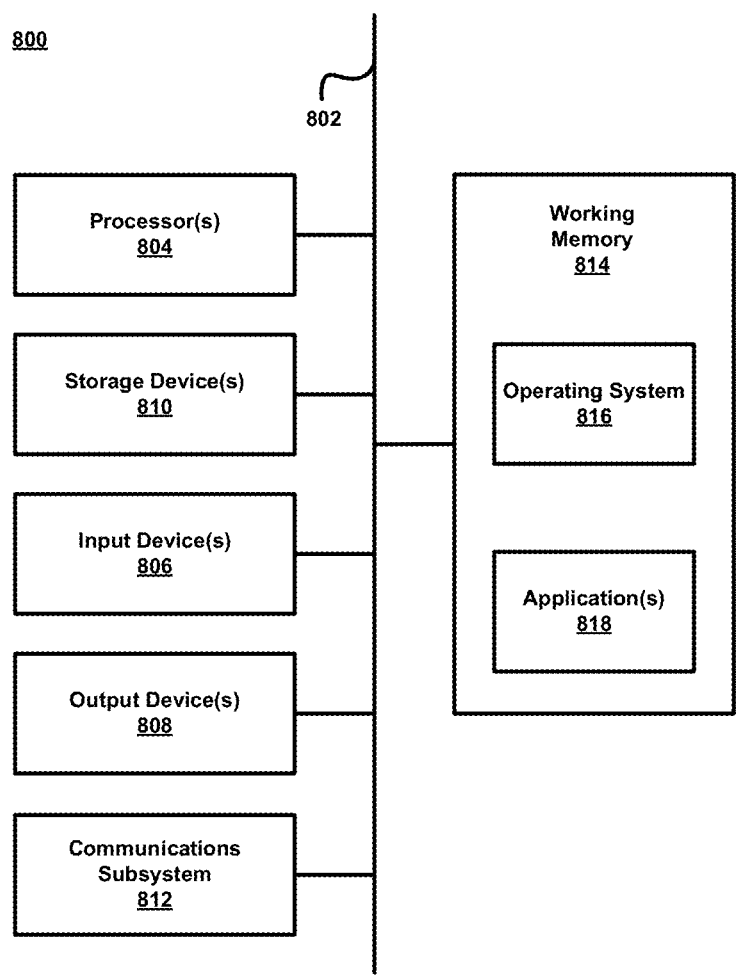
FIG. 8 shows an example computing system or device.

FIG. 8 shows an example computer system or device 800 in accordance with the disclosure. An example of a computer system or device includes an enterprise server, blade server, desktop computer, laptop computer, tablet computer, personal data assistant, smartphone, gaming console, STB, television receiver, and/or any other type of machine configured for performing calculations. Any particular one of the previously-described computing devices may be wholly or at least partially configured to exhibit features similar to the computer system 800, such as any of the respective elements of at least FIG. 2. In this manner, any of one or more of the respective elements of at least FIG. 2 may be configured to perform and/or include instructions that, when executed, perform the method of FIG. 1. Still further, any of one or more of the respective elements of at least FIG. 2 may be configured to perform and/or include instructions that, when executed, instantiate and implement functionality of the PTR 210 and/or the server(s) 218 as discussed above.

The computer device 800 is shown comprising hardware elements that may be electrically coupled via a bus 802 (or may otherwise be in communication, as appropriate). The hardware elements may include a processing unit with one or more processors 804, including without limitation one or more general-purpose processors and/or one or more special-purpose processors (such as digital signal processing chips, graphics acceleration processors, and/or the like); one or more input devices 806, which may include without limitation a remote control, a mouse, a keyboard, and/or the like; and one or more output devices 808, which may include without limitation a presentation device (e.g., television), a printer, and/or the like.

The computer system 800 may further include (and/or be in communication with) one or more non-transitory storage devices 810, which may comprise, without limitation, local and/or network accessible storage, and/or may include, without limitation, a disk drive, a drive array, an optical storage device, a solid-state storage device, such as a random access memory, and/or a read-only memory, which may be programmable, flash-updateable, and/or the like. Such storage devices may be configured to implement any appropriate data stores, including without limitation, various file systems, database structures, and/or the like.

The computer device 800 might also include a communications subsystem 812, which may include without limitation a modem, a network card (wireless and/or wired), an infrared communication device, a wireless communication device and/or a chipset such as a Bluetooth™ device, 802.11 device, WiFi device, WiMax device, cellular communication facilities such as GSM, W-CDMA, LTE, etc., and/or the like. The communications subsystem 812 may permit data to be exchanged with a network (such as the network described below, to name one example), other computer systems, and/or any other devices described herein. In many examples, the computer system 800 will further comprise a working memory 814, which may include a random access memory and/or a read-only memory device, as described above.

The computer device 800 also may comprise software elements, shown as being currently located within the working memory 814, including an operating system 816, device drivers, executable libraries, and/or other code, such as one or more application programs 818, which may comprise computer programs provided by various examples, and/or may be designed to implement methods, and/or configure systems, provided by other examples, as described herein. By way of example, one or more procedures described with respect to the method(s) discussed above, and/or system components might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a non-transitory computer-readable storage medium, such as the storage device(s) 810 described above. In some cases, the storage medium might be incorporated within a computer system, such as computer system 800. In other examples, the storage medium might be separate from a computer system (e.g., a removable medium, such as flash memory), and/or provided in an installation package, such that the storage medium may be used to program, configure, and/or adapt a general purpose computer with the instructions/code stored thereon. These instructions might take the form of executable code, which is executable by the computer device 800 and/or might take the form of source and/or installable code, which, upon compilation and/or installation on the computer system 800 (e.g., using any of a variety of generally available compilers, installation programs, compression/decompression utilities, etc.), then takes the form of executable code. It will be apparent that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some examples may employ a computer system (such as the computer device 800) to perform methods in accordance with various examples of the disclosure. According to a set of examples, some or all of the procedures of such methods are performed by the computer system 800 in response to processor 804 executing one or more sequences of one or more instructions (which might be incorporated into the operating system 816 and/or other code, such as an application program 818) contained in the working memory 814. Such instructions may be read into the working memory 814 from another computer-readable medium, such as one or more of the storage device(s) 810. Merely by way of example, execution of the sequences of instructions contained in the working memory 814 may cause the processor(s) 804 to perform one or more procedures of the methods described herein.

The terms "machine-readable medium" and "computer-readable medium," as used herein, may refer to any non-transitory medium that participates in providing data that causes a machine to operate in a specific fashion. In an embodiment implemented using the computer device 800, various computer-readable media might be involved in providing instructions/code to processor(s) 804 for execution and/or might be used to store and/or carry such instructions/code. In many implementations, a computer-readable medium is a physical and/or tangible storage medium. Such a medium may take the form of a non-volatile media or volatile media. Non-volatile media may include, for example, optical and/or magnetic disks, such as the storage device(s) 810. Volatile media may include, without limitation, dynamic memory, such as the working memory 814.

Example forms of physical and/or tangible computer-readable media may include a floppy disk, a flexible disk, hard disk, magnetic tape, or any other magnetic medium, a compact disc, any other optical medium, ROM (Read Only Memory), RAM (Random Access Memory), and etc., any other memory chip or cartridge, or any other medium from which a computer may read instructions and/or code. Various forms of computer-readable media may be involved in carrying one or more sequences of one or more instructions to the processor(s) 804 for execution. By way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 812 (and/or components thereof) generally will receive signals, and the bus 802 then might carry the signals (and/or the data, instructions, etc. carried by the signals) to the working memory 814, from which the processor(s) 804 retrieves and executes the instructions. The instructions received by the working memory 814 may optionally be stored on a non-transitory storage device 810 either before or after execution by the processor(s) 804.

It should further be understood that the components of computer device 800 can be distributed across a network. For example, some processing may be performed in one location using a first processor while other processing may be performed by another processor remote from the first processor. Other components of computer system 800 may be similarly distributed. As such, computer device 800 may be interpreted as a distributed computing system that performs processing in multiple locations. In some instances, computer system 800 may be interpreted as a single computing device, such as a distinct laptop, desktop computer, or the like, depending on the context.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those of skill with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations may be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example examples described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
   receiving, by a television receiver in a home network environment, packet traffic generated by network devices connected to the home network environment, wherein the network devices connected to the home network environment are different from the television receiver, and wherein the packet traffic is directed to systems external to the home network environment, wherein the television receiver includes:
   one or more audio/video decoders operable to convert encoded video and audio into a format suitable for output to display devices;
   a network interface operable to establish network connections with systems in the home network environment and external to the home network environment, wherein the packet traffic is received using the network interface; and
   an output interface operable to output audio and video signals for use by display devices;
   generating, by the television receiver, a first output signal encoding for a first interface that includes a first item for activating or deactivating a scanning service for scanning contents of packets of the packet traffic to identify data unauthorized for transfer external to the home network environment;
   receiving, by the television receiver, input corresponding to selection of the first item for activating the scanning service;
   activating, by the television receiver, the scanning service;
   generating, by the television receiver, a second output signal encoding for a second interface that includes a second item for activating or deactivating a notification service for generating messages indicating that transfers of data unauthorized for transfer external to the home network environment have been attempted;
   receiving, by the television receiver, input corresponding to selection of the second item for activating the notification service;
   activating, by the television receiver, the notification service;

scanning, by the television receiver, contents of packets of the packet traffic to identify data unauthorized for transfer external to the home network environment, wherein scanning includes scanning at least one of a header and a body of packets of the packet traffic to identify data unauthorized for transfer external to the home network environment;

determining, by the television receiver, that one or more first particular packets of the packet traffic include first data unauthorized for transfer external to the home network environment;

blocking, by the television receiver, the one or more first particular packets of the packet traffic that include the first data from being routed external to the home network environment;

generating, by the television receiver, a first message indicating that a first transfer of data unauthorized for transfer external to the home network environment has been attempted, wherein the first message includes a first option that, when activated, generates a first command to retain in memory a first action to implement upon subsequent identification of the first data, wherein the first action corresponds to blocking additional packets of packet traffic that include the first data;

sending, by the television receiver, the first message to a display device for display thereon, wherein sending the first message includes sending the first message to the display device for display as part of an electronic programming guide;

receiving, by the television receiver, input corresponding to activation of the first option;

determining, by the television receiver, that one or more second particular packets of the packet traffic include the first data unauthorized for transfer external to the home network environment;

blocking, by the television receiver, the one or more second particular packets of the packet traffic from being routed external to the home network environment based on the first command retained in memory;

determining, by the television receiver, that one or more third particular packets of the packet traffic include second data unauthorized for transfer external to the home network environment, wherein the second data is different from the first data;

generating, by the television receiver, a second message indicating that a second transfer of data unauthorized for transfer external to the home network environment has been attempted, wherein the second message includes a second option that, when activated, generates a second command to retain in memory a second action to implement upon subsequent identification of the second data, wherein the second action corresponds to ignoring additional packets of data that include the second data;

sending, by the television receiver, the second message to the display device for display thereon;

receiving, by the television receiver, input corresponding to activation of the second option;

routing, by the television receiver, the one or more third particular packets of the packet traffic external to the home network environment; and routing, by the television receiver, other packets of the packet traffic to systems external to the home network environment.

2. The method of claim 1, further comprising:
identifying, by the television receiver, a particular network device connected to the home network environment as a source of the one or more first particular packets of the packet traffic that include the first data; and blocking, by the television receiver, additional packets of the packet traffic originating from the particular network device from transfer external to the home network environment.

3. The method of claim 1, wherein sending the first message includes transmitting the first message by email, transmitting the first message to a mobile application, sending first the message by text message, or generating a third output signal encoding for a third interface that displays the first message.

4. The method of claim 1, wherein the first message includes an indication of type or form of data unauthorized for transfer external to the home network environment.

5. The method of claim 1, further comprising:
logging packet transmissions received from a particular network device connected to the home network environment.

6. The method of claim 1, wherein the first message includes a network path indication of a source of the one or more first particular packets of the packet traffic.

7. The method of claim 1, wherein the first message includes an alphanumeric identifier of a source of the one or more first particular packets of the packet traffic.

8. The method of claim 1, further comprising:
receiving, by the television receiver, additional input corresponding to selection of the first item for deactivating the scanning service;
deactivating, by the television receiver, the scanning service;
receiving, by the television receiver, additional packets of traffic directed to systems external to the home network environment; and
routing, by the television receiver, the additional packets of packet traffic external to the home network environment.

9. The method of claim 1, further comprising:
receiving by the television receiver, at least one definition of data unauthorized for transfer external to the home network environment.

10. The method of claim 1, further comprising:
receiving, by the television receiver, at least one definition of data authorized for transfer external to the home network environment.

11. The method of claim 1, further comprising:
receiving, by the television receiver, additional input corresponding to selection of the second item for deactivating the notification service.

12. A television receiver, comprising:
at least one processor;
one or more audio/video decoders operable to convert encoded video and audio into a format suitable for output to display devices;
a network interface operable to establish network connections with systems in a home network environment and external to the home network environment;
an output interface operable to output audio and video signals for use by display devices; and
at least one memory element communicatively coupled with and readable by the at least one processor and having stored therein processor-readable instructions that, when executed by the at least one processor, cause the at least one processor to perform operations including:

receiving, at the network interface, packet traffic generated by network devices connected to the home network environment, wherein the network devices connected to the home network environment are different from the television receiver, and wherein the packet traffic is directed to systems external to the home network environment;

generating a first output signal encoding for a first interface that includes a first item for activating or deactivating a scanning service for scanning contents of packets of the packet traffic to identify data unauthorized for transfer external to the home network environment;

receiving input corresponding to selection of the first item for activating the scanning service;

activating the scanning service;

generating a second output signal encoding for a second interface that includes a second item for activating or deactivating a notification service for generating messages indicating that transfers of data unauthorized for transfer external to the home network environment have been attempted;

receiving input corresponding to selection of the second item for activating the notification service;

activating the notification service;

scanning contents of packets of the packet traffic to identify data unauthorized for transfer external to the home network environment, wherein scanning includes scanning at least one of a header and a body of packets of the packet traffic to identify data unauthorized for transfer external to the home network environment;

determining that one or more first particular packets of the packet traffic include first data unauthorized for transfer external to the home network environment;

blocking the one or more first particular packets of the packet traffic that include the first data from being routed external to the home network environment;

generating a first message indicating that a first transfer of data unauthorized for transfer external to the home network environment has been attempted, wherein the first message includes a first option that, when activated, generates a first command to retain in memory a first action to implement upon subsequent identification of the first data, wherein the first action corresponds to blocking additional packets of packet traffic that include the first data;

sending the first message to a display device for display thereon, wherein sending the first message includes sending the first message to the display device for display as part of an electronic programming guide;

receiving input corresponding to activation of the first option;

determining that one or more second particular packets of the packet traffic include the first data unauthorized for transfer external to the home network environment;

blocking the one or more second packets of the packet traffic from being routed external to the home network environment based on the first command retained in memory;

determining that one or more third particular packets of the packet traffic include second data unauthorized for transfer external to the home network environment, wherein the second data is different from the first data;

generating a second message indicating that a second transfer of data unauthorized for transfer external to the home network environment has been attempted, wherein the second message includes a second option that, when activated, generates a second command to retain in memory a second action to implement upon subsequent identification of the second data, wherein the second action corresponds to ignoring additional packets of packet traffic that include the second data;

sending the second message to the display device for display thereon;

receiving input corresponding to activation of the second option;

routing the one or more third particular packets of the packet traffic external to the home network environment; and routing other packets of the packet traffic to systems external to the home network environment.

13. The television receiver of claim 12, wherein the operations further include:
identifying a particular network device connected to the home network environment as a source of the one or more first particular packets of the packet traffic that include the first data; and
blocking additional packets of the packet traffic originating from the particular network device from transfer external to the home network environment.

14. The television receiver of claim 12, wherein sending the first message includes transmitting the first message by email, transmitting the first message to a mobile application, sending the first message by text message, or generating a third output signal encoding for a third interface that displays the first message.

15. The television receiver of claim 12, wherein the first message includes an indication of type or form of data unauthorized for transfer external to the home network environment.

16. The television receiver of claim 12, wherein the operations further include:
logging packet transmissions received from a particular network device connected to the home network environment.

17. The television receiver of claim 12, wherein the first message includes a network path indication of a source of the one or more first particular packets of the packet traffic.

18. The television receiver of claim 12, wherein the message includes an alphanumeric identifier of a source of the one or more first particular packets of the packet traffic.

19. The television receiver of claim 12, wherein the operations further include:
receiving additional input corresponding to selection of the first item for deactivating the scanning service;
deactivating the scanning service;
receiving additional packets of packet traffic directed to systems external to the home network environment; and
routing the additional packets of packet traffic external to the home network environment.

20. A non-transitory computer readable medium comprising instructions that, when executed by one or more processors of a television receiver, cause the one or more processors to perform operations including:
receiving packet traffic generated by network devices connected to a home network environment, wherein the network devices connected to the home network environment are different from the television receiver, and wherein the packet traffic is directed to systems external to the home network environment;
generating a first output signal encoding for a first interface that includes a first item for activating or deactivating a scanning service for scanning contents of packets of the packet traffic to identify data unauthorized for transfer external to the home network environment;
receiving input corresponding to selection of the first item for activating the scanning service;
activating the scanning service;
generating a second output signal encoding for a second interface that includes a second item for activating or deactivating a notification service for generating messages indicating that transfers of data unauthorized for transfer external to the home network environment have been attempted;
receiving input corresponding to selection of the second item for activating the notification service;
activating the notification service;
scanning at least one of a header and a body of packets of the packet traffic to identify data unauthorized for transfer external to the home network environment;
identifying that one or more first particular packets of the packet traffic include first data unauthorized for transfer external to the home network environment;
blocking the one or more first particular packets of the packet traffic that include the first data from being routed external to the home network environment;
generating a first message indicating that a first transfer of data unauthorized for transfer external to the home network environment has been attempted, wherein the first message includes a first option that, when activated, generates a first command to retain in memory a first action to implement upon subsequent identification of the first data, wherein the first action corresponds to blocking additional packets of packet traffic that include the first data;
sending the first message to a display device for display thereon;
receiving input corresponding to activation of the first option;
identifying that one or more second particular packets of the packet traffic include second data unauthorized for transfer external to the home network environment;
blocking the one or more second particular packets of the packet traffic from being routed external to the home network environment based on the first command retained in memory;
identifying that one or more third particular packets of the packet traffic include second data unauthorized for transfer external to the home network environment, wherein the second data is different from the first data;
generating a second message indicating that a second transfer of data unauthorized for transfer external to the home network environment has been attempted, wherein the second message includes a second option that, when activated, generates a second command to retain in memory a second action to implement upon subsequent identification of the second data, wherein the second action corresponds to ignoring additional packets of data that include the second data;
sending the second message to the display device for display thereon;
receiving input corresponding to activation of the second option;
routing the one or more third particular packets of the packet traffic external to the home network environment; and
routing other packets of the packet traffic to systems external to the home network environment.

* * * * *